United States Patent
Harris et al.

(10) Patent No.: US 10,943,385 B2
(45) Date of Patent: Mar. 9, 2021

(54) USING TEXTURES IN GRAPHICS PROCESSING SYSTEMS

(71) Applicant: Arm Limited, Cambridge (GB)

(72) Inventors: Peter William Harris, Cambridge (GB); Edvard Fielding, Sor-Trondelag (NO)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 16/504,069

(22) Filed: Jul. 5, 2019

(65) Prior Publication Data

US 2020/0027260 A1    Jan. 23, 2020

(30) Foreign Application Priority Data

Jul. 20, 2018   (GB) ...................................... 1811913

(51) Int. Cl.
| | |
|---|---|
| *G06T 15/04* | (2011.01) |
| *G06T 1/20* | (2006.01) |
| *G06T 15/00* | (2011.01) |

(52) U.S. Cl.
CPC .............. *G06T 15/04* (2013.01); *G06T 1/20* (2013.01); *G06T 15/005* (2013.01)

(58) Field of Classification Search
CPC .. G09G 5/02; G06T 15/04; G06T 7/40; G06T 11/001; G06T 15/005; G06T 1/20; G06F 8/4442; G06F 2212/6026
See application file for complete search history.

(56) References Cited

U.S. PATENT DOCUMENTS

| | | | |
|---|---|---|---|
| 7,528,843 B1 | 5/2009 | Kilgard | |
| 2007/0103465 A1* | 5/2007 | Barenbrug | ............. G06T 15/50 345/426 |
| 2013/0332939 A1* | 12/2013 | Engh-Halstvedt | .... G06F 9/4881 718/106 |
| 2015/0089146 A1* | 3/2015 | Gotwalt | .................... G06T 1/60 711/133 |
| 2016/0328871 A1 | 11/2016 | Chen | |
| 2017/0287106 A1 | 10/2017 | Liu | |

FOREIGN PATENT DOCUMENTS

WO          00/68887         11/2000

OTHER PUBLICATIONS

GB Search Report dated Jan. 17, 2019, GB Patent Application No. GB1811913.1.

* cited by examiner

*Primary Examiner* — Antonio A Caschera
(74) *Attorney, Agent, or Firm* — Vierra Magen Marcus LLP

(57) ABSTRACT

When a renderer of a graphics processor is to perform a graphics rendering operation that uses one or more texture layers in accordance with contribution control data that controls the contribution that each texture layer makes to the rendering operation for a group of fragments, the renderer determines contribution control data for each fragment in the group, and based on the determined contribution control data, either: fetches and uses the texture data values for a texture layer for each fragment in the group from memory, or does not fetch texture data values for a texture layer for each fragment in the group from memory and instead uses a dummy value for the texture layer for each fragment in the group for the graphics rendering operation.

21 Claims, 14 Drawing Sheets

USING TEXTURES IN GRAPHICS PROCESSING SYSTEMS

BACKGROUND

The technology described herein relates to the use of textures in graphics processing systems.

Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

This process basically involves determining which sampling points in an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output (e.g. frame to be displayed)).

The rendering process then derives the data, such as red, green and blue (RGB) colour values and an "alpha" (transparency) value, necessary to represent the primitive at the sample points (i.e. "shades" each sample point). This can involve applying textures, blending sample point data values, etc.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

It is common in graphics processing systems to generate data values (e.g. colours) for fragments (and the sampling position(s) that they represent) in a render output (e.g. a frame to be displayed) by applying so-called textures or texture data to the surfaces to be drawn. Such textures are typically applied by storing an array of texture elements or "texels", each representing given texture data (such as colour, luminance and/or light/shadow, etc., values), and then mapping the texels on to the corresponding elements, such as (and typically) a set of sampling positions, for the render output in question (e.g. frame to be displayed).

Thus a graphics texture will typically be configured as an array of data elements (texture elements (texels)), each having a corresponding set of texture data stored for it. The texture data for a given position within the texture is then determined by sampling the texture at that position (e.g. by using a bilinear interpolation process).

When texture data is needed for a graphics processing operation (e.g. for rendering a frame (image) to be displayed), the texture data required for the rendering process is usually first fetched from the memory where it is stored, with the rendering pipeline implemented by the graphics processor then using the fetched texture data to perform the required rendering operation. Accordingly, rendering operations in graphics processing systems that use textures usually involve first looking up (fetching) the required stored texture data values.

Some rendering operations in graphics processing combine (mix) plural different texture layers, e.g. in accordance with control data that sets the contribution that each layer will make to the overall rendering operation. Such texture layer contribution control information can indicate, e.g., the transparency (alpha values) for the different texture layers, and/or can comprise a mix weight or weights that indicates the weights of the respective texture layers in the overall output. Such arrangements can be used, e.g., to mix multiple texture layers, such as layers representing rock, grass and sand, so as to, e.g., allow rock to show in some places and grass to show in others.

FIG. 1 illustrates this, and shows an exemplary stack of texture layers 1 with corresponding contribution control data 2 for each of the texture layers that will govern the contributions that the respective texture layers make when they are combined. FIG. 1 shows respective contribution control data values being provided for respective quarters of each texture layer, but other arrangements, such as providing contribution control data for smaller regions (e.g. per texel) of each texture layer would, of course, be possible.

The Applicants believe that there is scope for improvements to the use of textures in graphics processing systems.

BRIEF DESCRIPTION OF THE DRAWINGS

Embodiments of the technology described herein will now be described by way of example only and with reference to the accompanying drawings, in which.

Like numerals are used for like features in the drawings (where appropriate).

DETAILED DESCRIPTION

Figure 1:
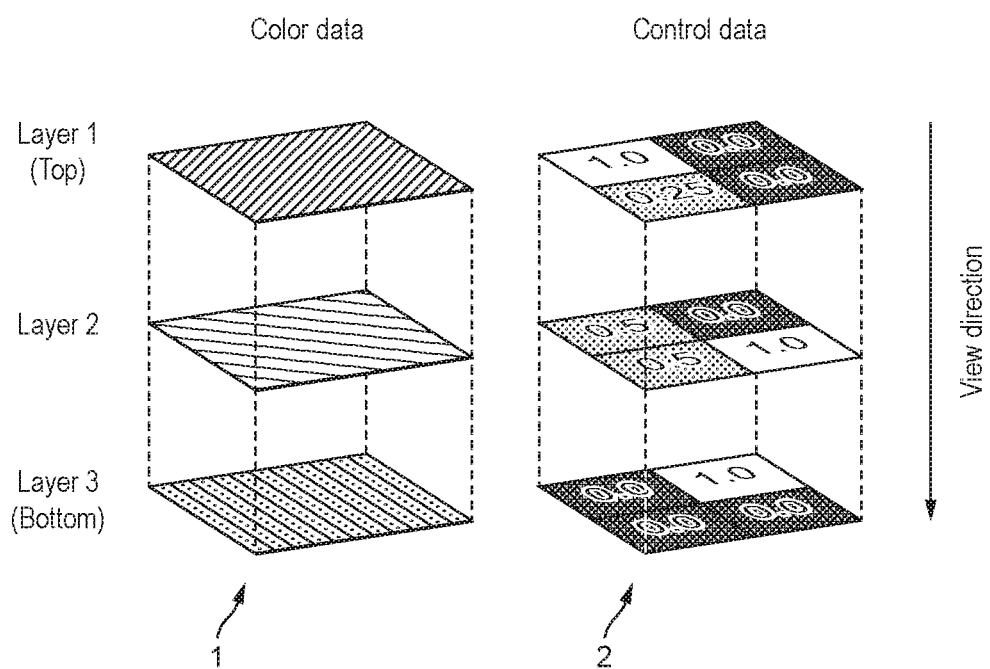
FIG. 1 shows an exemplary graphics rendering operation that combines plural texture layers in accordance with contribution control data for the texture layers.

A first embodiment of the technology described herein comprises a method of operating a graphics processor that executes a graphics processing pipeline to perform graphics processing operations, and which graphics processor comprises:

a rasteriser that rasterises input primitives to generate graphics fragments to be processed, each graphics fragment having one or more sampling points associated with it; and a renderer that performs graphics rendering operations on graphics fragments generated by the rasteriser;

the method comprising:

when the renderer is to perform, for a group of plural fragments that it is rendering as a group of fragments together, a graphics rendering operation that uses one or more texture layers in accordance with contribution control data that controls the contribution that each texture layer makes to the rendering operation:

the renderer:

before fetching the texture data values for each fragment of the group for at least one of the texture layers for the graphics rendering operation, determining texture contribution control data for each fragment in the group of fragments to be processed as a group of fragments together; and based on the determined contribution control data, either:

fetching the texture data values for the at least one texture layer for each fragment in the group from memory, and using the fetched texture data values for the at least one texture layer for each fragment in the group for the graphics rendering operation;

or using a dummy value for the at least one texture layer for each fragment in the group for the graphics rendering operation instead of fetching texture data values for the at least one texture layer for each fragment in the group from memory.

A second embodiment of the technology described herein comprises a graphics processor comprising:

a rasteriser that rasterises input primitives to generate graphics fragments to be processed, each graphics fragment having one or more sampling points associated with it; and a renderer that performs graphics rendering operations on graphics fragments generated by the rasteriser;

wherein the renderer is operable to:

when the renderer is to perform, for a group of plural fragments that it is rendering as a group of fragments together, a graphics rendering operation that uses one or more texture layers in accordance with contribution control data that controls the contribution that each texture layer makes to the rendering operation:

before fetching the texture data values for each fragment of the group for at least one of the texture layers for the graphics rendering operation, determine texture contribution control data for each fragment in the group of fragments to be processed as a group of fragments together; and based on the determined contribution control data, either:

fetch the texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

The technology described herein relates to rendering operations that use textures in graphics processing. In the technology described herein, when a graphics rendering operation that is to use one or more texture layers (e.g. that is the combine plural texture layers) is to be performed for a group of plural fragments together, rather than the graphics processing pipeline simply fetching (looking up) the texture data values for each texture layer for each fragment for the rendering operation, control data that is to set the contribution that the texture layers will make to the overall result is first determined (ascertained), and it is then decided for at least one of the texture layers (and, as will be discussed further below, in an embodiment for plural, and in an embodiment for all, of the texture layers (where there is more than only layer)), whether to fetch the actual texture data values for that layer for the fragments in the group from memory, or to omit that fetching operation and to use dummy values for that texture layer for each fragment instead, based on the contribution control data.

The Applicants have recognised in this regard, that in rendering operations that combine plural texture layers, for example, it can still be the case that one or more of those layers will not in practice contribute to the final, combined, rendering output. For example, when using alpha (transparency) blending, an upper layer or layers may be set (their control data may be set) to be completely transparent, such that in practice the texture data values for that texture layer will not contribute to the combined texture layer output at all. Correspondingly, a texture layer may be behind a completely opaque layer, such that again the obscured layer will not actually contribute to the combined texture output. Similarly, in the case of "additive" blending, a texture layer may be set to provide zero contribution to the blend (at least in certain render output regions).

The Applicants have further recognised that the situation where a texture layer may not contribute to a rendering operation that is, e.g., combining plural texture layers, can be determined from the control data that controls the contribution that the texture layer will make to the rendering operation (for example, as indicating that the texture layer is either completely transparent or completely opaque, or has a "weight" of "zero" in the texture layer rendering output).

The Applicants have further recognised that in the case where a texture layer will not in practice contribute to a rendering operation (e.g. where plural texture layers are being combined), then there is no need to provide to the rendering operation the actual, "correct", data values for the texture layer in question. In that case therefore, the fetching of the actual texture data values for the layer in question can be omitted (thereby improving performance and reducing energy consumption (as fetches of texture data can be a relatively significant use of power and bandwidth in graphics processing systems)).

However, in the technology described herein a dummy data value is used for a texture layer for which fetching of the "true" texture values has been omitted, as the Applicants have recognised that even in the case where it is determined that the fetching of the "true" texture layer data can be omitted, the subsequent rendering operation that is to use the data for that texture data layer will still require data values for that texture layer for its operation (so rather than simply using no values at all for that texture data layer, a set of dummy values, such as arbitrary data values or particular default values (such as all zeros), is provided and used in the rendering operation instead).

The technology described herein also considers the control data values and whether to omit the texture data fetching for a texture layer for the fragments of a group of fragments that are to be processed as a group together as a whole (rather than, e.g., at the level of a single fragment). This has the advantage of avoiding the possibility of having to handle respective fragments within a group of fragments that is to be processed together in different ways (i.e. having divergent process flow for different fragments within a fragment group), and also helps to ensure that any fragment group-wide operations, such as mipmap selection, will still be performed correctly.

The technology described herein accordingly provides a more efficient mechanism for performing rendering operations, e.g. when plural texture layers are to be combined, and can, in particular, avoid performing texture layer data look-ups where the "true" data values for a texture data layer are not in practice required. This then has the effect of reducing the number of texture layers for which data is (in practice) unnecessarily fetched from memory, thereby improving performance and reducing energy consumption.

The rasteriser of the graphics processing pipeline will generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will receive, e.g. primitives to be rasterised, test those primitives against sampling points and/or sets of sampling point positions, and generate fragments representing the primitives accordingly. The rasteriser can operate in any desired and suitable manner to do this.

The rasteriser can be implemented as any desired form of rasterising circuit, such as comprising a fixed-function rasterising circuit (hardware), and/or a programmable processing circuit (hardware) that can be programmed to operate in the desired manner (to perform the desired rasterisation operation).

The renderer processes the fragments generated by the rasteriser to generate rendered fragment data for (covered) sampling points that the fragments represent. The renderer can perform any desired and suitable rendering processes on fragments generated by the rasteriser, such as, and in an embodiment, one or more or all of blending, texture mapping, etc.

The renderer correspondingly can be implemented as any desired form of rendering circuit, such as comprising a fixed function rendering circuit (hardware), and/or a programmable processing circuit (hardware) that can be programmed to operate in the desired manner (to perform the desired rendering operations).

In an embodiment, the renderer comprises a programmable fragment shading stage (a fragment shader) that executes fragment shader programs to perform fragment shading operations on graphics fragments generated by the rasteriser.

The programmable fragment shader may comprise any suitable programmable hardware elements such as a programmable processing circuit. It may be provided as a separate circuit element to other programmable stages of the graphics processor (and processing pipeline). However, it may also be at least partially formed of a shared programmable graphics processing circuit.

In an embodiment, the renderer of the graphics processor comprises a texture mapper (texture mapping circuit) that is operable to fetch (load) texture data from memory, and to perform processing operations, such as filtering (combining) fetched texture data values, using that fetched texture data (to use fetched texture data when performing and to perform a processing operation). In an embodiment the texture mapper is operable to filter (combine) fetched texture data values, e.g. to return filtered texture values to the fragment shader.

In this case, the renderer (a processing element or stage of the renderer) is in an embodiment operable when performing graphics processing operations to send texturing requests to the texture mapper and to receive texturing results from the texture mapper. In an embodiment, the texture mapper is controlled by and operates in response to texturing requests received from the fragment shader of the renderer.

Thus, in an embodiment, the renderer comprises:

a programmable fragment shader that executes fragment shader programs to perform fragment shading operations on graphics fragments generated by the rasteriser; and a texture mapper operable to perform texture data lookups for texture data required for a fragment shading operation to be performed by the fragment shader, and to perform processing operations on texture data fetched from memory and to return the results of texture data processing operations to the fragment shader (for use in a fragment shading operation).

The rendering operation that uses one or more texture layers in accordance with contribution control data could use a single texture layer or plural texture layers. The technology described herein may, for example, be used for any rendering operation where a texture value is multiplied by a contribution factor (e.g. weight) (e.g. in a shader program), e.g. before being combined with other values.

In one embodiment, the rendering operation uses a single texture layer (in which case the contribution control data for that texture layer is determined and then used to determine whether to fetch the texture data values or use dummy values for the layer). In this case, the contribution of the single texture layer could be based on, for example, alpha (transparency) control data provided for the texture layer, and/or a contribution weight for the texture layer.

In another embodiment, the rendering operation uses plural (two or more) texture layers. In this case, the rendering operation in an embodiment combines the plural texture layers based on the contribution control data.

Where the rendering operation uses (e.g. combines) plural texture layers, it can use (e.g. combine) any desired plural number of texture layers, such as using two (and only two) texture layers, or more than two texture layers, as desired.

The technology described herein can be used for any graphics rendering operation that is to combine plural texture layers in accordance with contribution control data for the texture layers. In an embodiment the technology described herein is used (at least) for one or more of, and in an embodiment all of: "alpha blending" rendering operations (where different texture layers are combined in accordance with alpha (transparency) control data provided for the texture layers); and additive blending rendering operations (where plural texture layers are combined in accordance with control data that indicates a respective contribution weight for each of the texture layers).

Thus the technology described herein is in an embodiment used for rendering operations where the contribution of a texture layer (e.g. of the different layers) is based on transparency values for the layer or layers, and/or is based on contribution "weights" for the layer or layers, or a combination of the two.

The texture layers that are stored and used in the technology described herein can comprise any suitable and desired texture layers (textures) that may be used in a graphics processing operation that uses a texture layer or layers.

The technology described herein can be used irrespective of the form of texture data that is being used. In an embodiment it is used with textures that represent images and colours, in RGB (or RGBA) or YUV (and YUVA) formats, for example.

The technology described herein can also be used with other textures formats, such as with textures that are used for depth and/or stencil data (values), and when graphics textures and texture processing are being used to store and process other forms of data (not just colours and images), if desired.

As discussed above, each texture layer will be in the form of an array of texture data elements ("texels"), each of which has an appropriate data value or values associated with (and stored for) it. Thus, each texel value may comprise, e.g., a set of RGB (or RGBA) (red, green and blue (and alpha if present) data values); a set of YUV (or YUVA) (a set of chrominance and luminance values (and alpha if present) data values; a set of depth and/or stencil values; etc., depending upon the nature of the texture layer(s) that are to be used.

The contribution control data for the rendering operation (that controls how the texture layer(s) will be used) can comprise any suitable and desired control data that can be used to indicate and control the contribution(s) that data values from the texture layer or layers will make to the overall output. Thus the control data may, for example, be in the form of alpha (transparency) values to be used for the texture layer(s), and/or in the form of contribution weights (weight (scaling) values) to be used for the texture layer(s).

There could be a single set of control data provided for a rendering operation that can be used to determine how each of the texture layers will contribute to the rendering operation (i.e. such that, in effect, each of the texture layers will share the same, single set of contribution control data) (and in one embodiment this is the case).

Alternatively, in other embodiments, there could be plural sets of contribution control data provided for the rendering operation, such as plural texture layers, or each texture layer, having their or its own, respective set of contribution control data. Thus, in another embodiment, each texture layer that is to be used in the rendering operation has its own respective set of contribution control data that will control the contribution that that texture layer will make to the rendering operation.

There could be a single contribution control data value set for a texture layer (or all the texture layers) as a whole. However, in an embodiment, contribution control data values are provided for respective regions of a texture layer or of the texture layers (depending upon whether the contribution control data relates to a single texture layer or is to be used for plural (e.g. all of the) texture layers in common). Thus in an embodiment, the contribution control data for the rendering operation comprises a set of plural data values, with each data value being for a respective region of a texture layer or layers.

The set (or each set) of contribution control data correspondingly in an embodiment comprises an array of data values, with each data value to be used for a respective region of a texture layer or layers. There could, e.g., be a separate control data value for each individual texture data element (texel) in a texture layer, or respective control values could be provided for respective groups of texture data elements (texels) in a texture layer, so that, for example, each 4×4 block of texels will have a specified control data value, etc.

The contribution control data for a texture layer or layers can be provided in any suitable and desired manner. For example, it could be provided as a separate, "control" texture which defines the control data for the texture layer or layers in question. Thus there could, for example, be a single "control" texture defined for and associated with all the texture layers to be used for the rendering operation, or each texture layer for the rendering operation could have its own, respective, associated "control" texture. Additionally or alternatively, the control data could otherwise be associated with and provided for a texture layer or layers.

(In the case where the control data for a texture layer or layers is provided as a "control" texture itself, then it may be the case that control data from that control texture will need to be fetched from the memory in operation of the technology described herein, but that fetched control texture data will then be able to be used to determine whether the actual texture data values for a texture layer or layers needs to be fetched from memory, and so the technology described herein would still have the effect that a single texture load of the control data can then be used to omit performing further texture data value loads.)

The textures for the rendering operation (and the control data, as appropriate) will be stored in, and fetched from, appropriate memory of the graphics processing system.

The memory of the graphics processing system that the texture layers (texture data) (and control data, as appropriate) are stored in may comprise any suitable and desired memory system of the graphics processing system (e.g. the overall data processing system that the graphics processing system is part of), such as, and in an embodiment, the main memory for the graphics processing system (e.g. where there is a separate memory system for the graphics processor), or a main memory of the data processing system that is shared with other elements, such as a central processing unit (CPU), of the data processing system.

The renderer may interface directly with the memory, but in an embodiment interfaces with the (main) memory (and memory system) via an appropriate cache system (cache hierarchy), such as via an L2 cache of the main cache hierarchy of the memory system. Accordingly, the fetching (looking-up) of the texture data from the memory may comprise fetching that data from or via a cache of the (main)

memory system, e.g. in the case where the required data is already present in a cache, and/or the data fetching mechanism operates to first transfer data from the (main) memory to an appropriate cache before it is used.

The technology described herein is used when the renderer is processing groups of plural fragments together. This may be because, e.g., the renderer is configured to process plural fragments in parallel (in which case some or all of the plural fragments that are being processed in parallel may be the group of fragments that is being processed and that is considered in the technology described herein).

Additionally or alternatively, it may be that the processing of the fragments in the renderer (and/or for the rendering operation) considers and operates on plural fragments at the same time (together), for example, because data from plural fragments may be required as part of or for the rendering operation for the group of plural fragments in question.

For example, the renderer may be configured to render fragments from the rasteriser as respective groups of plural fragments, such that, for example, the renderer will, in effect, divide the set of fragments received from the rasteriser into respective groups of plural fragments, and then process each respective group of plural fragments in turn.

This may be, e.g., where the rendering process organises the fragments into respective groups of plural fragments so as, for example, for each group of plural fragments, use data from different fragments in the group to, e.g., derive derivatives across the output region that the group of fragment represents (e.g., and in an embodiment for use in the rendering and/or texturing operation). For example, the renderer may be configured to process fragments as respective 2×2 fragment "quads". Other fragment groupings would, of course, be possible.

Thus, the group (and groups) of plural fragments for which the operation in the manner of the technology described herein to determine whether to omit the fetching of texture data values for a texture layer is performed can be any suitable and desired group of plural fragments for which the rendering operation (or at least elements of the rendering operation) is to be performed for the group together (as a whole) (e.g., and in an embodiment, in parallel).

For example, where the graphics processing pipeline renders the fragments as respective groups of plural fragments (by rendering respective groups of plural fragments) (e.g. for the purposes of using data from different fragments to, e.g., derive derivatives across the output region that the group of fragments represents, such as in the case where the renderer of the graphics processing pipeline operates on 2×2 fragment "quads"), then in an embodiment, the technology described herein is implemented for and in respect of such fragment groups (i.e. such that each fragment "group" (e.g. 2×2 fragment quad) will be processed and considered in the manner of the technology described herein).

The fragment groups that are considered in the technology described herein could also or instead be based on the number of fragments that the renderer can process in parallel. For example, in the case where the renderer includes a fragment shader (as discussed above) that is operable to execute respective groups ("warps") of execution threads (with each execution thread corresponding to a respective fragment), then the groups of fragments that are considered in the technology described herein could comprise the respective groups of threads (warps) that are processed by the fragment shader.

(Graphics fragment shader execution can group execution threads (where each thread corresponds to one fragment) into "groups" or "bundles" of threads, where the threads of one group are run in lockstep, e.g. one instruction at a time. This allows instruction fetch and scheduling resources to be shared between all the threads in the group. (Other terms used for such thread groups include "warps" and "wavefronts". For convenience the term thread group will be used herein, but this is intended to encompass all equivalent terms and arrangements, unless otherwise indicated.))

In this case, the operation in the manner of the technology described herein could be performed across a (and for each) thread group (warp) as a whole, i.e. to determine whether the control data for the entire thread group (warp) that is being processed in parallel by the fragment shader indicates whether a texture layer will contribute to the rendering output for each fragment that the thread group (warp) represents or not (and in one embodiment, this is what is done) (and then proceed accordingly).

Additionally or alternatively, where a given thread group (warp) that can be handled by the fragment shader contains more than one fragment group that is to be processed as a group of fragments together (e.g. a (and each) thread group (warp) contains plural fragment "quads" as discussed above), then it would be possible to implement the technology described herein at the resolution of single (or plural) fragment groups (e.g. quads) within the same thread group (warp), if desired (and in one embodiment, this is what is done). In this case, those fragment groups (e.g. quads) for which the texture data value fetching is to be omitted could, e.g., be masked out from the rendering operation for the thread group (warp) in question, but with any remaining fragment groups (e.g. quads) in the thread group (warp) still being subjected to the texture data value fetching (look-up) operation.

Other arrangements would, of course, be possible.

The renderer uses the contribution control data for the texture operation to determine whether or not to fetch the texture data values for at least one texture layer for the fragments in the group for the rendering operation that is to be performed. To do this, the renderer first determines texture contribution control data for each fragment in the group of fragments being considered.

It should be noted here that the determination of the texture contribution control data by the renderer will, and in an embodiment does, comprise the renderer determining (ascertaining) texture contribution control data that has previously been set for the texture layer or layers and the graphics rendering operation in question. The texture contribution control data (values) will be set, e.g. by the application that requires the graphics rendering operation. The determination that the renderer performs is to ascertain the previously set contribution control data (or at least whether it has a particular value or not), to then use in the determination of whether to fetch the actual texture values or to use dummy values. The renderer is thus identifying the value(s) of the previously set texture contribution control data (at least to the extent necessary to determine whether to fetch the actual texture data values or to use dummy values).

The renderer can determine the texture operation contribution control data for each fragment in any suitable and desired manner. This may depend upon how the contribution control data is provided. For example, the renderer could fetch that data appropriately from memory.

In the case where there is a single set of contribution control data provided for all the texture layers together, then the renderer will use that contribution control data for this purpose. In the case where respective, different sets of contribution control data are provided for respective, different texture layers to be used in the graphics rendering operation, then the renderer could consider the contribution control data for a single texture layer only (or for less than all the texture layers), but in an embodiment determines and considers the contribution control data for all the texture layers.

The renderer determines (ascertains) the texture contribution control data for the fragments in the group of fragments before fetching texture data values for at least one of the texture layers for the graphics rendering operation.

In the case where plural texture layers are being used for the graphics rendering operation, then this could be done for a single one of the texture layers, or for some or all of the texture layers, as desired.

In the case where fetching texture data values for plural texture layers is to be considered, then each layer could be considered separately (in isolation), e.g. by determining contribution control data for that layer and whether to load that layer's texture data values, before then considering the next layer, and so on, in turn. In this case, the texture data for a first layer could be fetched (or at least the request to fetch that data issued) before the contribution control data for a next layer is determined (fetched) and so on. Thus in this case, each layer will be considered in turn (e.g.), and the texture data fetches for one layer can be issued before another layer has been considered.

Thus, in an embodiment, where plural texture layers are being used, the technology described herein may comprise determining texture contribution control data for a first one of the texture layers for the graphics rendering operation before fetching the texture data values for that layer, and based on the determined contribution control data either fetching the texture data values for that texture data or using dummy values for that texture layer, and then for another texture layer, determining texture contribution control data for that texture layer before fetching the texture data values for that texture layer, and based on the determined contribution control data for that texture layer, either fetching the texture data values for that texture layer or using dummy values for that texture layer, with the texture data values for the first texture layer being able to be fetched before the determined texture contribution control data for the second layer is determined (if desired) (and so on for any other texture layers to be considered).

Alternatively, any texture data fetches could be deferred until the contribution control data and the determination for all the layers has been made. In this case, the texture contribution control data (for all the layers) will be determined before fetching texture data values for any of the texture layers to be used for the graphics rendering operation (i.e. the contribution control data will be determined and considered before any actual texture data values for the texture layers are fetched).

The renderer can use the contribution control data to determine whether to fetch the texture data values for a texture layer, or to omit fetching the texture data values for the layer and use dummy data values for that texture layer instead, in any suitable and desired manner.

In an embodiment, the render uses the control data to determine whether there is a texture layer that will not in fact contribute to the output of the rendering operation for the group of fragments being considered at all, and, if so, omits the fetching of the actual texture data values for the fragments in the group of fragments for that texture layer (and uses dummy values instead).

Thus the renderer will determine a respective texture contribution control data value or values for each fragment in the group of fragments being considered, and in an embodiment then uses that determined contribution control data value or values to determine for the fragment in question, whether a texture layer will not in fact contribute to the output of the rendering operation for that fragment. The determinations for each of the individual fragments in the group will then be taken together to determine whether the texture layer does not in fact contribute to the output of the rendering operation for all the fragments in the group or not. This is in an embodiment done for plural, and in an embodiment for each, of the texture layers.

Thus, in an embodiment, the renderer determines from the contribution control information for the rendering operation for the group of fragments being considered, whether a texture layer will contribute to the output of the rendering operation for any of the plural fragments in the group, and when it determines from the control information that a texture layer will not contribute (will other than contribute) to the output of the rendering operation for any of the fragments in the group, it then does not fetch the texture data values for that texture layer from memory, but uses dummy values for that texture layer when performing the rendering operation for the group of fragments.

Correspondingly when it is determined from the control information that a texture layer will contribute to the rendering output for at least one of the fragments in the group being considered, the renderer instead operates to fetch (and use) the actual texture data values for that texture layer from the memory for (all of) the fragments of the group of fragments in question.

Whether a texture layer will contribute to the output of the rendering operation for a fragment can be determined based on the control information in any suitable and desired manner. For example, the control information may be used to determine whether a (or the) texture layer has any contribution weight in the output of the rendering operation for a thread. Correspondingly, the control information may be used to determine whether a (or the) texture layer is fully transparent or fully opaque at the fragment in question (and accordingly, e.g. depending upon the position of the layer and/or the rendering operation that is being carried out, whether a (or the) texture layer will accordingly contribute to the output for the fragment or not).

The determination may be based, for example, on contribution control data provided for the rendering operation as a whole, and/or control data provided for individual texture layers (in which case the determination may be based on control data provided for the texture layer in question, and/or on control data provided for one or more of the other texture layers).

Thus the contribution control data that is used for this determination for a texture layer could, e.g., be control data for (that is associated with) the texture layer in question (e.g. indicating its contribution weight to the combined texture output, and/or whether it is completely opaque or completely transparent); and/or could be control data for (associated with) a different texture layer (e.g. indicating that that another texture layer is completely opaque and so will completely obscure the texture layer being considered); and/or may be control data provided for the rendering operation as a whole (and from which the relative contributions of the different texture layers can be determined).

It would correspondingly be possible to perform the determination in the manner of the technology described herein for texture layers to be used in the rendering operation individually, or to perform that determination, in effect, for the texturing layers as a whole (for the rendering operation as a whole). This may depend, for example, upon whether the rendering operation uses a respective, separate, set of control data for each texture layer, or whether a (e.g. single) set of control information is provided and used for the rendering operation as a whole.

The determination of whether to fetch the actual texture data values for a texture layer, or to omit that fetching and use dummy values instead, is performed for at least one of the texture layers. Thus, in the case where the graphics rendering operation uses a single texture layer, the determination will be performed for that single texture layer. In the case where the graphics rendering operation uses plural texture layers, then the determination could be performed for only a single one of those plural texture layers, but in an embodiment is performed for and in respect of plural texture layers, and in an embodiment each texture layer, that are being used.

Thus, in an embodiment, it is determined, based on the control information, whether to fetch texture data values from memory for the group of fragments, or whether to omit that fetching and to use dummy values in the rendering operation for the fragments of the group of fragments, for each texture layer that is being combined for the rendering operation.

In the case where it is determined that actual texture data values for a texture layer should be fetched from memory, then those texture data values should be, and are in an embodiment, fetched from the memory, e.g., and in an embodiment, in the normal manner for the graphics processing system and graphics processing pipeline in question. Thus, in an embodiment, appropriate requests for the required texture data values are sent to the memory system.

On the other hand, where the fetching of texture data values for a texture layer is to be omitted, and dummy values are to be used instead, then fetching of texture data values for that texture layer for the fragments in the group of fragments in question will be omitted, and the renderer will instead use dummy values for that texture layer for the fragments in the rendering operation. Accordingly, in this case no requests for the texture data values are (in an embodiment) sent to the memory system (i.e. the sending of requests for the texture data values to the memory system is omitted).

The dummy values that are used in the present can comprise any suitable and desired dummy values, and can be any suitable and desired arbitrary values (as they will not in practice contribute to the result of the graphics rendering operation). (However, as discussed above, the Applicants have recognised that texture values are still required for a texture layer that will not contribute, as the rendering operation will expect and need to use data values for that texture layer, even if in practice those data values will not contribute to the rendering operation result.)

The dummy value that is used could comprise, e.g., a particular, in an embodiment selected, in an embodiment predetermined, default value (such as zero) (and in an embodiment this is the case). This may help to give predictable results. Such a default value could, for example, be set (e.g. hard-coded) as a graphics processor-wide constant (there wouldn't be any need to set default values per execution thread, for example).

Alternatively, the operation could simply be configured to return arbitrary data as the dummy value (e.g. to leave the contents of the destination register unchanged). This will then allow, for example, the corresponding instruction to be retired without writing anything to the destination register, etc., and so may reduce power consumption.

Once the renderer has fetched all the actual data values for the texture layers for the rendering operation that are required, it will, and in an embodiment does, then perform the rendering operation for each fragment in the group of fragments using fetched texture data values or dummy values for the texture layer(s) for the fragments, as appropriate. The rendering operation can use the texture values as desired (and required), e.g. to apply the "texture" to the fragments in question, so as to provide textured and rendered output data for the fragments in the group.

This operation will then be repeated for the next group of fragments to be processed, and so on, until all the desired fragments for the render output in question have been processed. The so-generated render output can then, e.g., be output, e.g. to memory or for transmission or for display, as desired.

Thus, in an embodiment, the method of the technology described herein comprises (and the graphics processor and renderer are correspondingly configured and operable to), the renderer:

performing, for a group of plural fragments together, a graphics rendering operation that combines plural texture layers in accordance with contribution control data that controls the contribution that each texture layer makes to the rendering operation, the performing the graphics rendering operation comprising:

the renderer:

before fetching texture data values for each fragment of the group for at least one texture layer for the graphics rendering operation, determining texture contribution control data for each fragment in the group of fragments being processed; and based on the determined contribution control data, determining whether there is a texture layer for the graphics rendering operation that will not (that will other than) contribute to the output of the graphics rendering operation for any of the fragments in the group of fragments being processed; and when it is determined that there is a texture data layer that will not contribute to the output of the graphics rendering operation for any of the fragments in the group of fragments being processed, not (other than) fetching texture data values for that texture data layer from memory, and instead using a dummy value for that texture layer for each fragment in the group of fragments being processed; and for any texture layer for which it is not (it is other than) determined that the texture layer will not contribute to the output of the graphics rendering operation for any of the fragments in the group of fragments being processed, fetching texture data values for that texture layer for each fragment in the group from memory;

and performing the graphics rendering operation using the fetched texture data values and any dummy values for the texture layers.

The renderer could be configured to always operate in the manner of the technology described herein, e.g. at least in the case where a rendering operation to be performed is to combine plural texture layers. However, the Applicants have recognised that operation in the manner of the technology described herein may not always be applicable or desirable, and so in an embodiment, the renderer is controlled and triggered to operate in the manner of the technology described herein in use (e.g., and in an embodiment, in response to being required to perform particular rendering operations).

This may be achieved in any suitable and desired manner, such as by setting appropriate control or state information associated with (for) the rendering operation.

In an embodiment, in the case where the renderer includes a programmable fragment shader, the operation in the manner of the technology described herein is controlled and triggered by including an appropriate rendering operation instruction or instructions (that will, inter alia, cause the fragment shader and thus renderer to operate in the manner of the technology described herein) in a shader program to be executed by the fragment shader.

Thus in an embodiment, the operation in the manner of the technology described herein is triggered by sending an instruction to a fragment shader of the renderer (by including an instruction to trigger this operation in a fragment shader program to be executed by a fragment shader of the renderer).

In an embodiment, this is done by including in the shader program an instruction that will cause the contribution control data for the texture layers to be looked up and used as an input parameter before the rendering operation. This could be done by, for example, including a specific (texture) look-up instruction that will trigger the looking up (e.g. fetching from memory) of the contribution control data in question that is in addition to any instruction to look-up (fetch) the texture data values themselves, or it could be done by including a "modified" texture look-up instruction in the shader program, that as well as (potentially) looking up (fetching) the texture data values themselves, also triggers the determining of the contribution control data prior to the looking up of the values of the texture layers themselves.

The contribution control data look-up instruction should be, and is in an embodiment, included in the shader program before any instruction or instructions that will perform the texture layer rendering operation itself (as the texture values (whether "true" or "dummy" values) need to be known and determined before the rendering operation itself is performed). Thus in an embodiment, when it is determined that a shader program includes an instruction or instructions to perform a rendering operation that will use one or more texture layers in accordance with contribution control data, the shader program that is issued to the graphics processor (to the fragment shader) for execution will, and in an embodiment does, include the (original) instructions to perform the rendering operation, but will also include before the instruction or instructions to perform the rendering operation, an instruction or instructions both to (potentially) load the texture data values required for the rendering operation, and to determine (e.g. load) the contribution control data for the texture layer(s) to be used in the rendering operation.

The fragment shader when it executes the so-configured fragment shader program will, accordingly, first encounter the instruction or instructions to determine the contribution control data and to look-up (fetch) the texture data values and so execute those instructions accordingly for a (and the) group of fragments that it is being executed for, and then subsequently execute the instruction or instructions to perform the rendering operation itself, which it will then accordingly perform using either the looked-up data values or the dummy values for the texture layer(s) for the fragments as determined and fetched (or not) in response to the earlier instructions in the shader program.

Thus, in an embodiment, the renderer includes a programmable fragment shading stage (a fragment shader) that executes fragment shader programs to perform fragment shading operations on graphics fragments generated by the rasteriser;

and the method of the technology described herein comprises:
including in a fragment shader program that includes an instruction or instructions that when executed will cause the renderer to perform a graphics rendering operation that uses one or more texture layers in accordance with contribution control data that controls the contribution that each texture layer makes to the rendering operation:
a graphics program instruction that when executed will cause the renderer to, before performing the graphics rendering operation that uses one or more texture layers in accordance with contribution control data for a group of plural fragments that the renderer is rendering as a group of fragments together:
determine texture contribution control data for each fragment in the group of fragments to be processed as a group of fragments together before fetching any texture data values for each fragment of the group for at least one of the texture layers for the graphics rendering operation; and
based on the determined contribution control data, either:
fetch texture data values for the at least one texture layer for each fragment in the group from memory, and use the fetched texture data values for the at least one texture layer for each fragment in the group for the graphics rendering operation;
or not fetch texture data values for the at least one texture layer for each fragment in the group from memory and instead use a dummy value for the at least one texture layer for each fragment in the group for the graphics rendering operation;
the method further comprising:
issuing the fragment shader program to the programmable fragment shading stage;
and
the programmable fragment shading stage executing:
the fragment shader program for groups of plural fragments received from the rasteriser;
and
when executing the fragment shader program for a group of plural fragments that the renderer is rendering as a group of fragments together, in response to the graphics program instruction, causing the renderer to:
for the group of plural fragments that is being rendered as a group of fragments together:
determine texture operation contribution control data for each fragment in the group of fragments being rendered as a group of fragments together, before fetching the texture data values for each fragment of the group, for at least one of the texture layers for the graphics rendering operation; and
based on the determined contribution control data, either:
fetch the texture data values for the at least one texture layer for each fragment in the group from memory, and use the fetched texture data values for the at least one texture layer for each fragment in the group for the graphics rendering operation;
or not fetch texture data values for the at least one texture layer for each fragment in the group from memory and instead use a dummy value for the at least one texture layer for each fragment in the group for the graphics rendering operation.

Correspondingly, another embodiment of the technology described herein comprises a graphics processing system comprising:

graphics processor comprising:
a rasteriser that rasterises input primitives to generate graphics fragments to be processed, each graphics fragment having one or more sampling points associated with it; and
a renderer that performs graphics rendering operations on graphics fragments generated by the rasteriser, the renderer including a programmable fragment shader that executes fragment shader programs to perform fragment shading operations on graphics fragments generated by the rasteriser;
the graphics processing system further comprising:
processing circuitry configured to include in a fragment shader program that includes an instruction or instructions that when executed will cause the renderer to perform a graphics rendering operation that uses one or more texture layers in accordance with contribution control data that controls the contribution that each texture layer makes to the rendering operation:
a graphics program instruction that when executed will cause the renderer to, before performing the graphics rendering operation that uses one or more texture layers in accordance with contribution control data for a group of plural fragments that the renderer is rendering as a group of fragments together:
determine texture contribution control data for each fragment in the group of fragments to be processed as a group of fragments together before fetching any texture data values for each fragment of the group for at least one of the texture layers for the graphics rendering operation; and
based on the determined contribution control data, either:
fetch texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory;
and wherein:
the programmable fragment shader of the renderer is configured to, when executing a fragment shader program that includes the graphics program instruction for a group of plural fragments that the renderer is rendering as a group of fragments together, in response to the graphics program instruction, cause the renderer to:
for the group of plural fragments that is being rendered as a group of fragments together:
determine texture operation contribution control data for each fragment in the group of fragments being rendered as a group of fragments together, before fetching the texture data values for each fragment of the group, for at least one of the texture layers for the graphics rendering operation; and
based on the determined contribution control data, either:
fetch the texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory.

The technology described herein also extends to the operation of the fragment shader in response to the "contribution determination" instruction per se.

Thus, an embodiment of the technology described herein comprises a method of operating a programmable fragment shading stage of a renderer of a graphics processing pipeline, which programmable fragment shading stage executes fragment shader programs to perform fragment shading operations on graphics fragments generated by a rasteriser of the graphics processing pipeline;

the method comprising:
the programmable fragment shading stage, when executing a fragment shader program that when executed will cause the renderer to perform a graphics rendering operation that uses one or more texture layers in accordance with contribution control data that controls the contribution that each texture layer makes to the rendering operation for a group of plural fragments that the renderer is rendering as a group of fragments together, in response to a graphics program instruction included in the fragment shader program, causing the renderer to:
for the group of plural fragments that is being rendered as a group of fragments together:
determine texture operation contribution control data for each fragment in the group of fragments being rendered as a group of fragments together, before fetching the texture data values for each fragment of the group, for at least one of the texture layers for the graphics rendering operation; and
based on the determined contribution control data, either:
fetch the texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory.

Another embodiment of the technology described herein comprises a programmable fragment shading stage for a renderer of a graphics processing pipeline, comprising:

processing circuitry that executes fragment shader programs to perform fragment shading operations on graphics fragments generated by a rasteriser; and wherein the programmable fragment shading stage is configured to, when executing a fragment shader program that when executed will cause the renderer to perform a graphics rendering operation that uses one or more texture layers in accordance with contribution control data that controls the contribution that each texture layer makes to the rendering operation for a group of plural fragments that the renderer is rendering as a group of fragments together, in response to a graphics program instruction included in the fragment shader program, cause the renderer to:
for the group of plural fragments that is being rendered as a group of fragments together:
determine texture contribution control data for each fragment in the group of fragments being rendered as a group of fragments together, before fetching the texture data values for each fragment of the group, for at least one of the texture layers for the graphics rendering operation; and based on the determined contribution control data, either:
  fetch the texture data values for the at least one texture layer for each fragment in the group from memory, and use the fetched texture data values for the at least one texture layer for each fragment in the group for the graphics rendering operation;
  or use a dummy value for the at least one texture layer for each fragment in the group for the graphics rendering operation instead of fetching texture data values for the at least one texture layer for each fragment in the group from memory.

As will be appreciated by those skilled in the art, these embodiments of the technology described herein can, and in an embodiment do, contain any one or more or all of the features of the technology described herein discussed herein, as appropriate.

The "contribution determination" instruction to trigger operation in the manner of the technology described herein can be included in a shader program by any suitable and desired component or stage of the overall graphics processing system. In an embodiment, the contribution determination instruction is included in the shader program by the compiler for the shader in question (thus the fragment shader compiler).

The compiler can be operable to include the contribution determination instruction in the shader program in any suitable and desired manner. For example, it could analyse the shader program to determine whether it includes a rendering operation that is to use one or more texture layers (e.g. that combines plural texture layers) in accordance with contribution control data, and when it determines that a shader program includes (instruction(s) to perform) a rendering operation that is to use one or more texture layers in accordance with contribution control data, includes a "contribution determination" instruction in the shader program.

In an embodiment, the compiler analyses a shader program to determine if it includes instructions to perform a rendering operation that is to use one or more texture layers in accordance with contribution control data, and when it identifies such an operation, then determines whether that is the only instance in the shader program in which some or all (and in an embodiment all) of the texture layers that the operation relates to are used. If so, then the compiler will identify that the operation in the manner of the technology described herein is possible for that rendering operation, and so include an appropriate instruction to trigger operation in the manner of the technology described herein in the shader program for the rendering operation in question.

In an embodiment, the compiler does this by identifying (and in an embodiment creating a list of) texture layer look-ups (calls) in the shader program, and then for an (and in an embodiment each) identified texture look-up in the shader program, determines whether the texture look-up result is weighted with contribution control data once and only once before it is used. If the result of the texture look-up is weighted exactly once before use, then the compiler determines that operation in the manner of the technology described herein is possible for the texture layer in question, and so will then include in the shader program, an appropriate instruction or instructions to trigger operation in the manner of the technology described herein for that texture layer.

When, on the other hand, the compiler determines, for example, that the texture look-up in the shader program is not (is other than) weighted exactly once before its result is used (i.e. such that "true" data values for the texture layer in question will be needed for at least one rendering operation in the shader program in any event), then the compiler configures the shader program so as not to operate in accordance with the manner of the technology described herein in respect of that texture layer or layers (i.e. does not modify the shader program to trigger operation in the manner of the technology described herein for the texture layer in question).

When it is determined for a shader program that operation in the manner of the technology described herein can be performed in respect of a rendering operation and/or texture layer for the shader program, then the compiler should, and in an embodiment does, configure the shader program so as to trigger operation in the manner of the technology described herein in respect of the rendering operation and/or texture layer in question. This can be done in any suitable and desired manner, but as discussed above, in an embodiment is done by including an appropriate instruction or instructions in the shader program to trigger the operation in the manner of the technology described herein.

The technology described herein also extends to the operation of including the instruction(s) in a fragment shader program to be executed by a fragment shader of a graphics processing pipeline.

Thus a further embodiment of the technology described herein comprises a method of operating a graphics processing system comprising:
  including in a fragment shader program to be executed by a programmable fragment shading stage of a renderer of a graphics processing pipeline that includes an instruction or instructions that when executed will cause the renderer to perform a graphics rendering operation that uses one or more texture layers in accordance with contribution control data that controls the contribution that each texture layer makes to the rendering operation:
    a graphics program instruction that when executed will cause the renderer to, before performing the graphics rendering operation that uses one or more texture layers in accordance with contribution control data for a group of plural fragments that the renderer is rendering as a group of fragments together:
  determine texture contribution control data for each fragment in the group of fragments to be processed as a group of fragments together before fetching any texture data values for each fragment of the group for at least one of the texture layers for the graphics rendering operation; and
  based on the determined contribution control data, either:
    fetch texture data values for the at least one texture layer for each fragment in the group from memory, and use the fetched texture data values for the at least one texture layer for each fragment in the group for the graphics rendering operation;
    or use a dummy value for the at least one texture layer for each fragment in the group for the graphics rendering operation instead of fetching texture data values for the at least one texture layer for each fragment in the group from memory.

Another embodiment of the technology described herein comprises a compiler that compiles programs to generate instructions for execution by a programmable fragment shading stage of a renderer of a graphics processing pipeline, wherein the compiler is configured to:
  include in a fragment shader program to be executed by a programmable fragment shading stage of a renderer of a graphics processing pipeline that includes an instruction or instructions that when executed will cause the renderer to perform a graphics rendering operation that uses one or more texture layers in accordance with contribution control data that controls the contribution that each texture layer makes to the rendering operation:

a graphics program instruction that when executed will cause the renderer to, before performing the graphics rendering operation that uses one or more texture layers in accordance with contribution control data for a group of plural fragments that the renderer is rendering as a group of fragments together:

determine texture contribution control data for each fragment in the group of fragments to be processed as a group of fragments together before fetching any texture data values for each fragment of the group for at least one of the texture layers for the graphics rendering operation; and based on the determined contribution control data, either:

fetch texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

As will be appreciated by those skilled in the art, all of these embodiments of the technology described herein can and in an embodiment do include any one or more or all of the features of the technology described herein described herein.

The compiler may, e.g., and in an embodiment does, run on a CPU (e.g. host processor) of the data processing system that includes the graphics processor (such that the compiler and compiled code all run on separate processors within the overall data processing system, e.g. graphics processing system)). However, other arrangements would be possible, such as the compiler running on the same processor as the compiled code, or the compiler being run on a separate processor, such as the program being pre-compiled on a separate system and being distributed in a compiled form.

The determination of whether the actual texture data values for a texture layer need to be fetched, or whether default texture data values can be used instead for a texture layer (e.g. in response to an instruction that triggers that determination in a shader program being executed by the renderer) can be performed in and by any suitable desired element and stage of the renderer.

In one embodiment, this determination is performed by a texture mapper (the texture mapping execution unit) of the renderer.

In this case, the texture mapper could itself determine (ascertain) the contribution control data for the texture layer or layers for the fragments in the fragment group, and determine whether to fetch (look-up) the actual texture data values or not, accordingly (and in one embodiment, this is the case).

Additionally or alternatively, in arrangements which use a "frontend" control unit (e.g. a message daemon) to send messages to the texture mapper to trigger its operations, then that control unit (message daemon) could, and in an embodiment does, determine (ascertain) the relevant contribution data values (weights) for the fragments for the texture layer or layers in question, but then pass an appropriate indication of those contribution control data values for the fragments to the texture mapper for the texture mapper then to determine whether to perform the texture data value fetch (look-up) or not.

In this case, the frontend controller (message daemon) could provide the actual contribution control data values (e.g. as full floating point values) to the texture mapper to do the determination, or, e.g., and in an embodiment, in the case where it is simply desired to determine whether the contribution of a texture layer is non-zero (useful) or zero (redundant), then the contribution control data could be, in effect, represented as (and thus compressed into) a single bit per fragment (either 1 or 0, depending upon whether the contribution of the texture layer will be useful or not), with the texture mapper then using that contribution indication to determine whether the texture look-up (fetch) is required or not.

In the case where the frontend controller (message daemon) provides the actual contribution control data values to the texture mapper, then the texture mapper could, if desired, be configured to weight any actual texture data values that it fetches (looks up) and returns using the contribution data values that have been provided by the frontend controller. This may then avoid having to perform further texture data value weighting operations on the returned texture data values from the texture mapper.

It would also be possible for the frontend controller (message daemon) for the texture mapper to itself perform the determination of whether to fetch the actual texture data values for a texture layer or not (and in one embodiment, this is done). In this case, rather than that frontend controller passing contribution control data information to the texture mapper for the texture mapper to do in the determination, the frontend controller will itself perform the determination and then, in an embodiment, either send control messages to the texture mapper to perform the texture data value look-ups (fetches) or not, accordingly.

In an embodiment, the frontend controller (message daemon) and the texture mapper are both able to perform a determination of whether to fetch the actual texture data values for a texture layer or not. In this case, the frontend controller could, for example, and in an embodiment, perform the determination for thread groups (warps) as a whole, with the texture mapper then (if necessary), in an embodiment, performing the determination for individual fragment groups (e.g. quads) within a thread group (warp), e.g., and in an embodiment, in the case where the frontend controller determines that the actual data values for a texture layer will be needed for at least one fragment group (e.g. quad) within a thread group (warp) being considered.

Other arrangements would, of course, be possible.

The technology described herein can be used for all forms of output that a graphics processor and processing pipeline may be used to generate, such as images (frames) for display, render-to-texture outputs, etc. The output, e.g. fragment shaded data values, from the graphics processing are in an embodiment exported to external, e.g. main, memory for storage and use, such as to a frame buffer for a display.

As well as the rasteriser and renderer (e.g. fragment shader), the graphics processing pipeline that the graphics processor executes can, and in an embodiment does, also contain any other suitable and desired processing stages that a graphics processing pipeline may contain such as an early depth (or an early depth and stencil) tester, a late depth (or depth and stencil) tester, a blender, a tile buffer (in the case of a tile-based graphics processing pipeline), a write out unit, etc.

In embodiments, the graphics processor comprises, and/or is in communication with, one or more memories and/or memory devices that store the data described herein, and/or store software for performing the processes described herein. The graphics processor may also be in communication with a host microprocessor, and/or with a display for displaying images based on the data generated by the graphics processor.

The technology described herein is applicable to any suitable and desired form or configuration of graphics processor. In an embodiment, the graphics processing system and graphics processor are a tile-based system and processor, respectively.

In an embodiment, the various functions of the technology described herein are carried out on a single graphics processing platform that generates and outputs the rendered fragment data that is, e.g., written to the frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements and/or processing circuits and/or programmable hardware elements and/or processing circuits that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Furthermore, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processing system and pipeline can otherwise include any one or more or all of the usual functional units, etc., that graphics processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Figure 2:
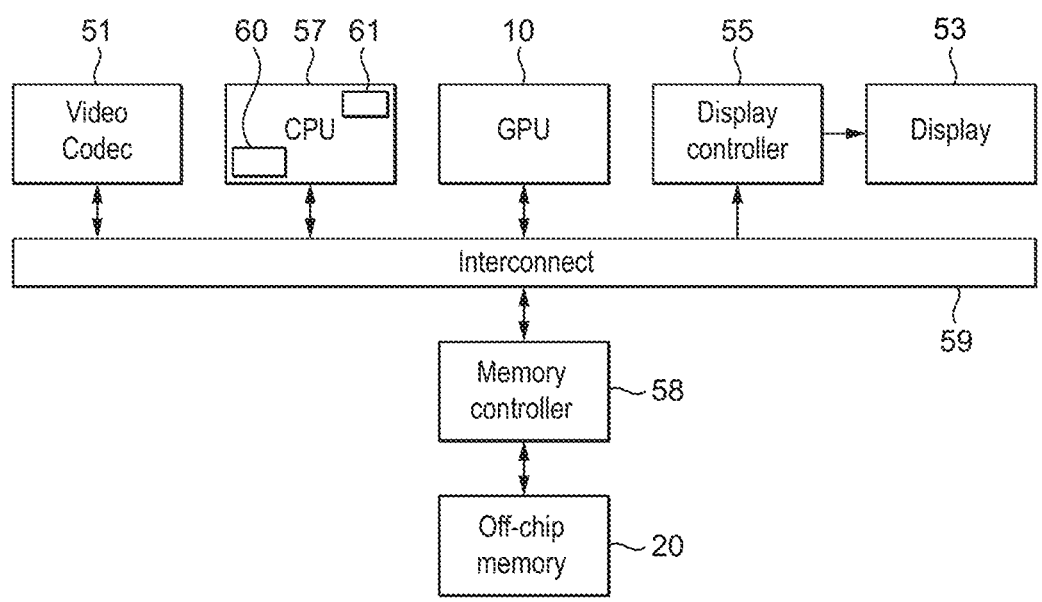
FIG. 2 shows an exemplary data processing system in which the technology described herein may be implemented.

FIG. 2 shows an exemplary data processing system in which the technology described herein and the present embodiment may be implemented.

The exemplary data processing system shown in FIG. 2 comprises a host processor comprising a central processing unit (CPU) 57, a graphics processing unit (GPU) 10, a video codec 51, a display controller 55, and a memory controller 58. As shown in FIG. 2, these units communicate via an interconnect 59 and have access to an off-chip memory system (memory) 20, via a memory controller 58. In this system the GPU 10, video codec 51, and/or a CPU 57 will generate frames (images) to be displayed, and the display controller 55 will then provide the frames to a display 53 for display.

In use of this system, an application 60, such as a game, executing on the host processor (CPU) 57, will, for example, require the display of frames on the display 53. To do this, the application 60 will submit appropriate commands and data to a driver 61 for the graphics processing unit 10 that is executing on the CPU 57. The driver 61 will then generate appropriate commands and data to cause the graphics processing unit 10 to render appropriate frames for display and to store those frames in appropriate frame buffers, e.g. in the main memory 20. The display controller 55 will then read those frames into a buffer for the display from where they are then read out and displayed on the display panel of the display 53.

The present embodiments and the technology described herein relate in particular to the situation where the graphics processing unit 10 is using textures when rendering a frame for output (e.g. for display). Such textures will comprise arrays of data elements (texture elements (texels)), each having an associated data value or values in the data format of the texture in question.

The textures will typically comprise images that are to be applied to graphics entities, such as primitives, to be rendered, and will normally be stored in the off-chip memory 20 from where they can then be read in by the GPU 10 when required. (When using a texture to generate a render output, the GPU 10 may fetch the texture data from the memory 20 and store it in a local, texture cache of the GPU 10, with the texture data then being read from the texture cache, when needed, and used to generate the render output, e.g. frame for display, if desired.)

Figure 3:
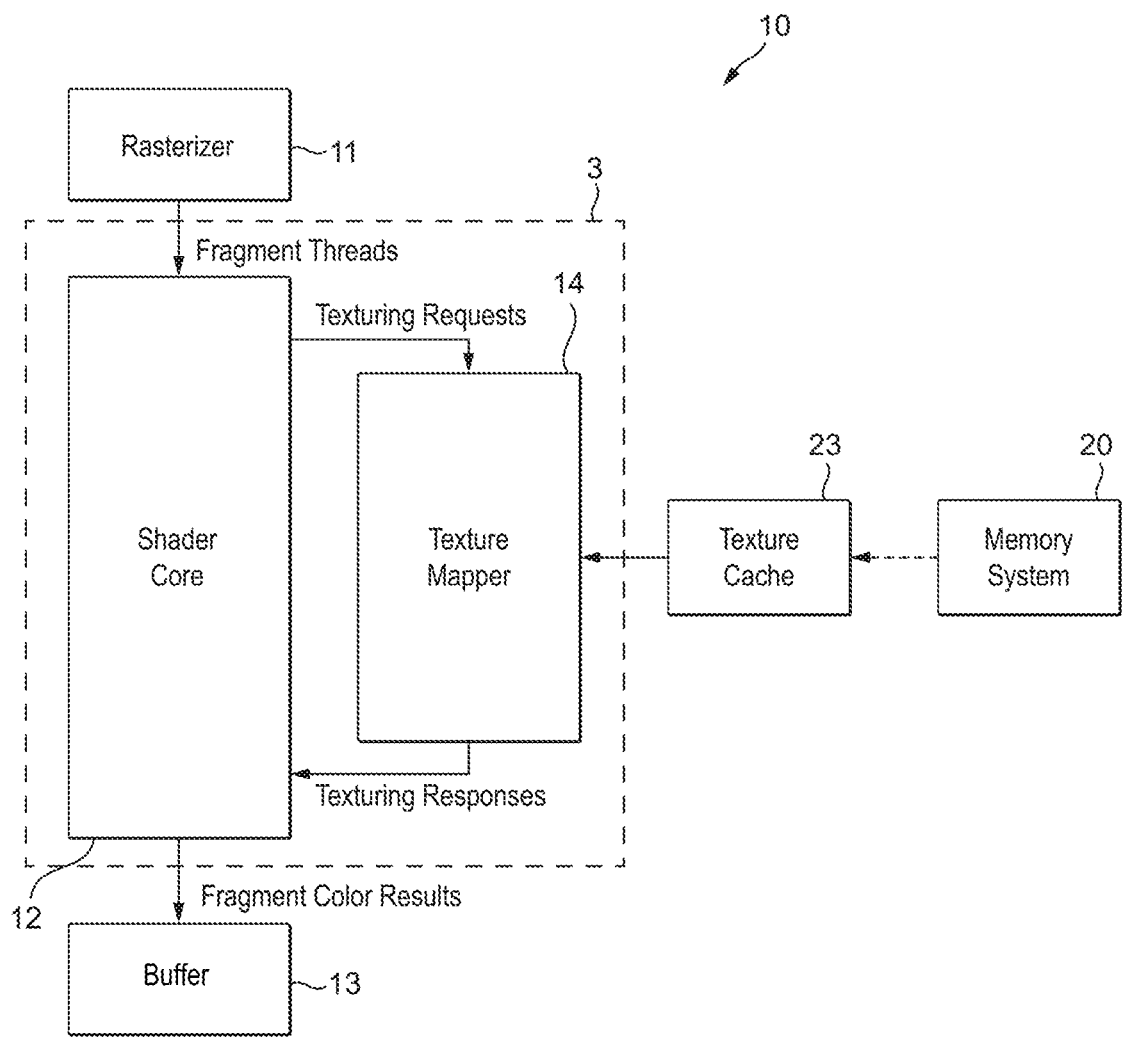
FIG. 3 shows schematically an exemplary graphics processing system in which the technology described herein may be implemented.
Figure 4:
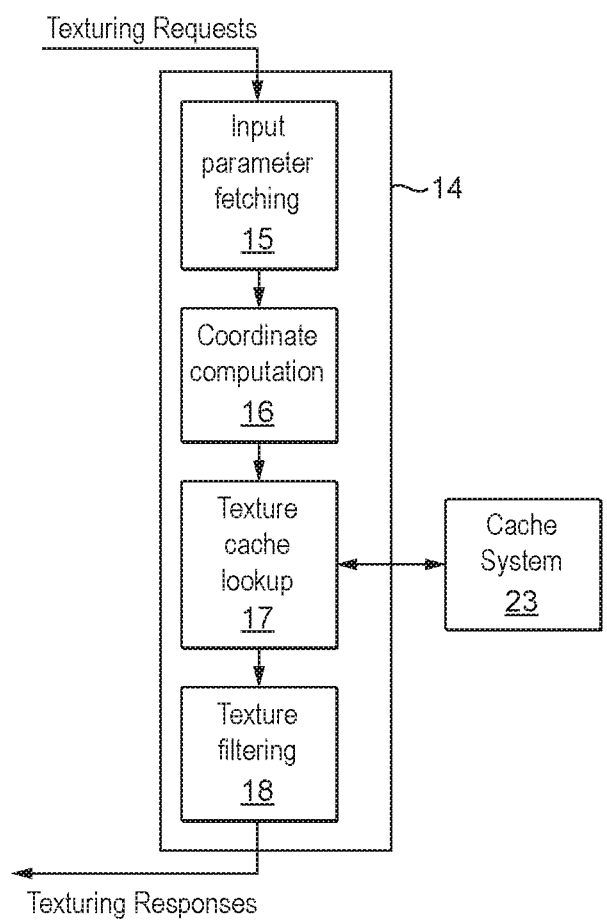
FIG. 4 shows the texture mapper of the graphics processing system of FIG. 3 in more detail.

FIGS. 3 and 4 show schematically the elements of the graphics processing unit 10 of the system shown in FIG. 2 that are relevant to the operation of the present embodiments. As will be appreciated by those skilled in the art, there may be other elements of the graphics processing unit 10 that are not illustrated in FIGS. 3 and 4.

In the present embodiment, the GPU 10 is a tile-based graphics processor. However, other arrangements are, of course, possible.

As shown in FIG. 3, the graphics processing unit 10 implements a graphics processing pipeline that includes, inter alia, a rasterizer 11, a renderer 3 comprising a (programmable) fragment shader core 12 and a texture mapper 14, and a buffer 13 (e.g. in memory 20) for storing the output render target (e.g. frame to be displayed). The texture mapper 14, is, inter alia, in communication with the memory system 20, e.g. via a texture cache 23.

The system memory 20 will store, inter alia, graphics textures to be used by the GPU 10. The system memory 20 may, e.g., be a disk drive or other storage medium (e.g. a hard disk, a RAID array of hard disks, a solid state disk) of or accessible to the host system in which the graphics processing unit 10 is located, and may be an internal storage medium of the host system, or an external or removable storage medium.

As shown in FIG. 4, the texture mapper 14 may comprise, for example, an input parameter fetching unit 15, a coordinate computation unit 16, a texture cache lookup unit 17, and a texture filtering unit 18.

The arrows in FIGS. 3 and 4 indicate the main ways in which data flows between the various components of the graphics processing pipeline and the memory 20. There may also be other communication routes or directions that are not indicated.

The rasterizer 11 receives as its input primitives (e.g. triangles) to be used to generate a render output, such as a frame to be displayed, and rasterizes those primitives into individual graphics fragments for processing. To do this, the rasterizer 11 rasterizes the primitives to sample points representing the render output, and generates graphics fragments representing appropriate sampling positions for rendering the primitives. The fragments generated by the rasterizer 11 are then sent onwards to the shader core (renderer) 12 for shading.

The shader core 12 executes a shader program or programs for the fragments issued by the rasterizer 11 in order to render (shade) the fragments.

In the present embodiments, the fragment shader 12 executes a respective execution thread for each fragment that it is shading. Moreover, it processes the fragments that it receives from the rasteriser 11 as respective 2×2 fragment quads (i.e. respective groups of 2×2 fragments). This is so as to facilitate, for example, the derivation of appropriate dX/dY derivatives across each 2×2 fragment quad (which derivatives may then be used, for example, for texture mipmap selection, for example). Accordingly, the fragment shader core 12 will process the fragments that it receives from the rasteriser, as respective groups (quads) of 2×2 fragments.

Figure 7:
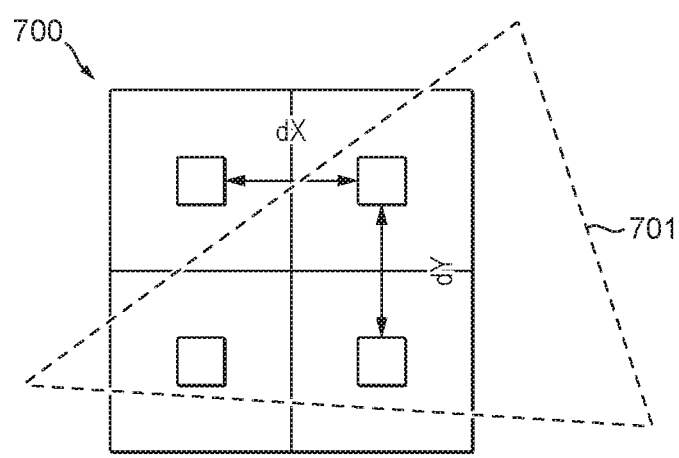
FIG. 7 shows schematically a 2×2 fragment quad that is processed by the renderer in the embodiments of the technology described herein.

FIG. 7 illustrates this and shows an exemplary 2×2 fragment quad 700 partially covered by an exemplary primitive 701, and the derivation of dX/dY derivatives across the fragment quad 700 for use during mipmap selection (the derivatives of the texture coordinates may be used to (approximately) project a fragment-sized box into the texture coordinate space).

Furthermore, in the present embodiments, the fragment shader core 12 is operable to process respective execution threads (with each execution thread corresponding to a respective fragment) in the form of execution thread groups ("warps"), where the execution threads of the group are executed in lockstep, one instruction at a time. The fragment shader core 12 could, for example, be configured to execute thread groups comprising four threads (i.e. to have a "warp" width of 4), in which case the fragment shader core 12 will execute a 2×2 fragment quad in lockstep, or it could be the case that the fragment shader core 12 has a warp width that is greater than 4 (e.g. 8 or 16), and so will process as a given thread group (warp) a plurality of 2×2 fragment quads. Either arrangement is possible in the present embodiments.

To perform its fragment shading processes, the programmable fragment shader core 12 executes graphics fragment shading programs. Each such program will comprise a set of graphics program instructions that are executed in the appropriate order to perform the desired fragment shading processes.

The shader programs may have no, one, or more, texturing instructions (texturing operations) that are required to be executed by the texture mapper 14. When a texturing instruction is encountered by the shader core 12, a texturing message is sent from the shader core 12 to the texture mapper 14, instructing the texture mapper 14 to follow one or more texturing instructions. After the texture mapper 14 has finished its texture processing (carrying out these instructions), the final result is sent back to the shader core 12 in a response message for use when shading the fragment in question.

The texture mapper 14 includes suitable processing circuitry to perform texturing instructions. This processing circuitry may, e.g., be in the form of a dedicated hardware element that is configured appropriately, or it may, e.g., comprise programmable processing circuitry that has been programmed appropriately. In an embodiment, a dedicated hardware texture mapper is used.

The "shaded" fragment from the shader core 12 is then stored as part of the output render target in the buffer 13, e.g. the main memory 20, e.g. for subsequent display.

Thus, when instructed by the shader core 12, the texture mapper 14 reads textures from the memory 20 (as required), performs various processing steps, and returns a colour sampled from the texture back to the shader core 12.

As part of this processing, the input parameter fetching unit 15 may, for example, read in the parameters of the texture to be sampled and the parameters of how to sample the texture from appropriate state information for the texture.

The coordinate computation unit 16 may, for example, receive the texturing request message from the shader core 12 containing the coordinates to sample in the texture (e.g. given in a normalized coordinate-system where (0.0, 0.0) is the top-left corner of the texture and (1.0, 1.0) is the bottom-right corner of the texture), together with the parameters read by the input parameter fetching unit, and determine the actual texel indices in the texture to be looked up from the texture in memory 20.

The texture cache lookup unit 17 fetch the required texture data from the stored texture in the memory 20. As part of this operation, it may first check whether the required texture data is already present in the texture cache 23, and if so, read the texture data from the texture cache 23. For a typical bilinear lookup, texture data from four texels are read from a 2×2 texel region of the texture.

The texture filtering unit 18 may, for example, receive the four texels of the bilinear lookup from the texture cache lookup unit 17, and determine interpolation weights and compute a weighted average of the texture data for the sampling position in question. This is then output to (returned to) the shader core 12.

The present embodiments relate in particular to the situation where the renderer 3 and in particular the fragment shader core 12 is performing a rendering operation that operates to combine plural texture layers in accordance with contribution control data provided for those layers that indicates and controls the contribution that each of the layers makes to the overall result of the rendering operation. An example of such a rendering operation would be where plural texture layers (e.g. respectively representing rock, grass, sand) are to be mixed together based on contribution control data, so as to allow, e.g., rock to show in some places and grass to show in others. This may be used for game terrain, for example.

In such rendering operations, the texture layers may be combined in accordance with, e.g., respective transparency (alpha) values for the texture layers, and/or in accordance with respective "mix" weights for the texture layers. Typically the appropriate contribution control data (e.g. transparency or weight values) will be provided for respective regions within the texture layers, so that at different regions within the texture layers, different combinations of the texture layers will be output.

Figure 5:
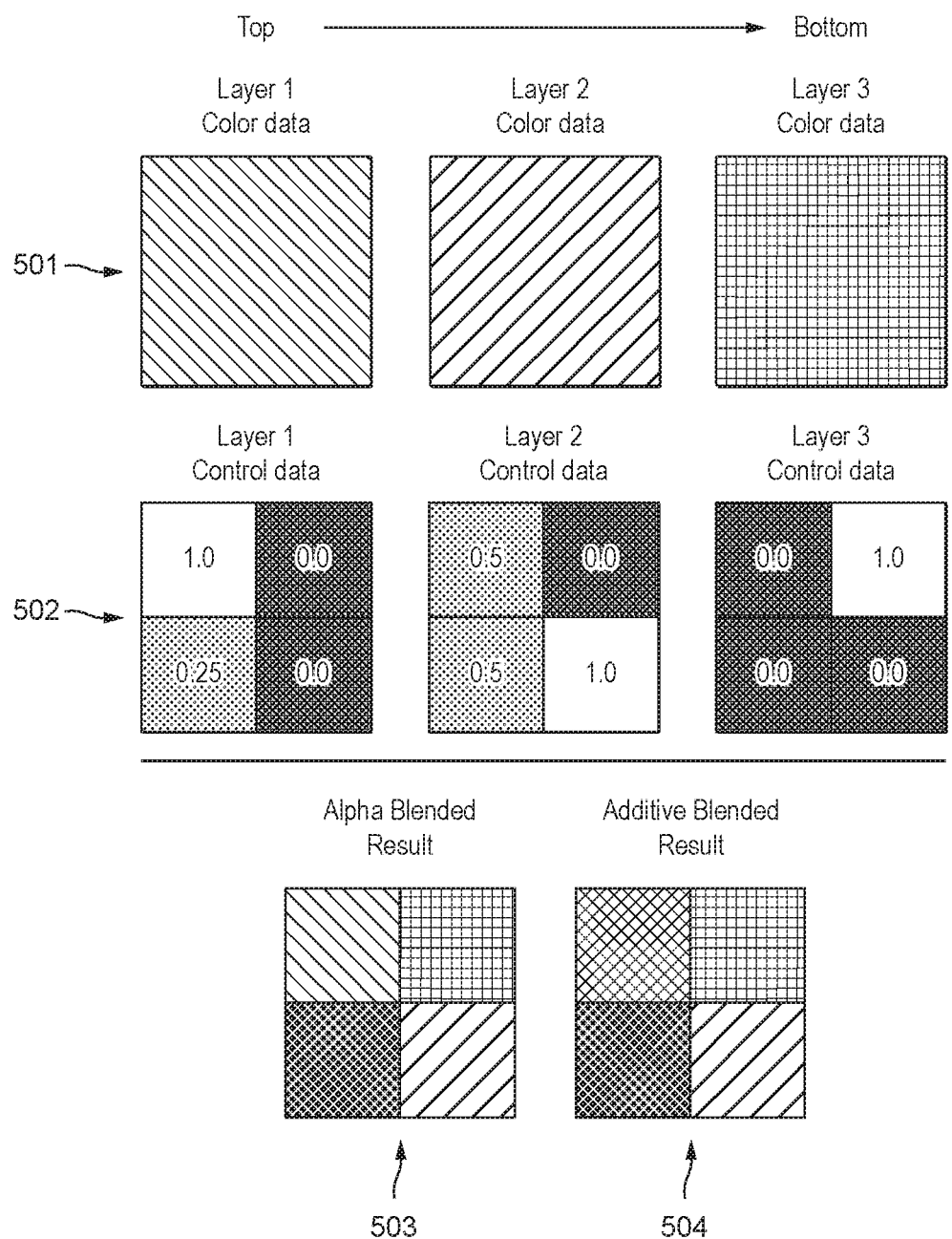
FIG. 5 shows schematically the combining of plural texture layers in accordance with contribution control data for the texture layers in exemplary graphics rendering operations.

FIG. 5 illustrates this, and shows an exemplary set 501 of three texture layers that are to be combined in accordance with respective sets 502 of contribution control data for each layer. In FIG. 5, the contribution control data 502 is shown as being defined for respective quarters of the textures corresponding to the texture layers, but other arrangements, such as more finer grained contribution control data (i.e. for smaller regions of the texture layers) could be used, if desired.

The sets of contribution control data 502 may be stored, for example, as respective contribution control data textures that are associated with the textures 501 that store the actual texture data values (the colour data) for the texture layers.

FIG. 5 also shows the result 503 of combining the texture layers in accordance with the control data in the case where the control data represents alpha (transparency) values and the texture layers are combined in accordance with the defined transparency values. (With a contribution control data value of 1 indicating that the texture layer (in the region in question) is completely opaque (and so will obscure any layer that it overlies), and a contribution control data value of 0 indicating that the layer (in the region in question) is completely transparent.)

FIG. 5 correspondingly shows the resultant output combination 504 for the set of texture layers 501 in the case where the texture layers are additively blended in accordance with the contribution control data 502 (i.e. such that the contribution control data 502 represents a "mix" (contribution) weight for each respective region of the texture layer in question). (With a contribution control data value of 0 indicating that the layer does not contribute at all to the "mix" (in the region in question).)

The Applicants have further recognised that when performing rendering operations where plural texture layers are combined in accordance with contribution control data, then, depending upon the nature of the texture layer combining operation and the contribution control data for the respective texture layers, it can be the case that in practice a given texture layer will not actually contribute to the rendering output (at least for particular regions of the texture layers (of the output combined texture)).

For example, in the case of alpha blending, an upper layer that is completely transparent will not in fact contribute to the combined rendering result. Correspondingly, a lower layer that is behind a completely opaque layer will not contribute to the rendering output result either. In the case of additive blending, a layer that has a contribution weight of 0 will not contribute to the rendering output.

Accordingly, it can be the case that a given texture layer will not in practice contribute to a rendering operation that is being performed, e.g. for a particular region of the render output.

Figure 6:
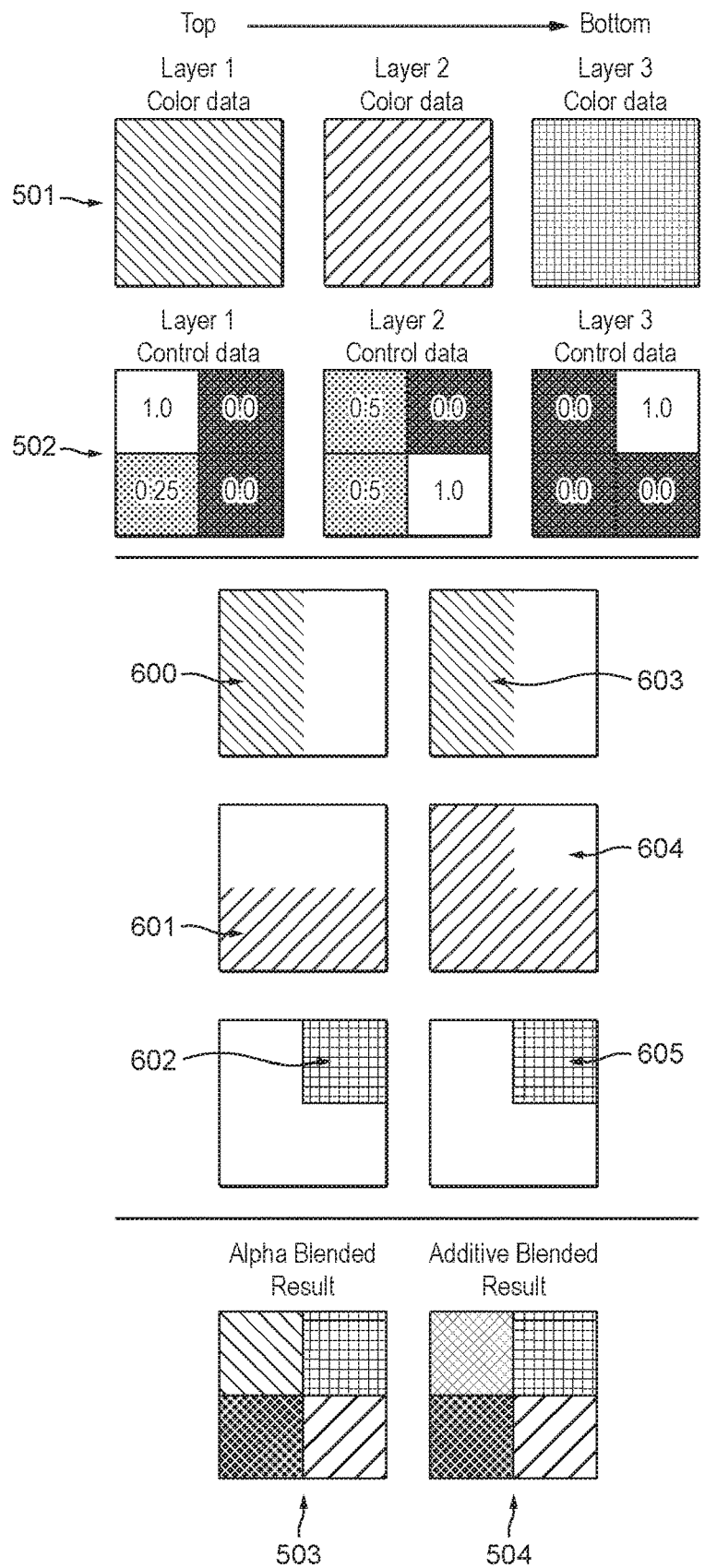
FIG. 6 shows schematically the contributions that the different texture layers make in the exemplary graphics rendering operations shown in FIG. 5.

FIG. 6 illustrates this for the exemplary texture layer combining operations shown in FIG. 5. Thus, as shown in FIG. 6, for the exemplary contribution control data 502 shown in FIG. 6, in the case of the alpha (transparency) blending operation, for layer 1, only the right-hand half 600 will contribute to the overall rendering result, layer 2 will only contribute to the rendering output result in the bottom half 601 of the output texture, and texture layer 3 will only contribute to the rendering output result in the upper right quarter 602 of the output rendering result.

Correspondingly, for the additive blending operation, the top layer, layer 1, will only contribute to the rendering output result in the left-hand half 603 of the output, the second texture layer will contribute to the output rendering result in all except the upper right quarter 604 of the rendering output, and the third (bottom) texture layer will only contribute to the overall rendering output in the upper right-hand quarter 605 of the rendering output.

The Applicants have further recognised that in the case where a texture layer will not in practice contribute to the rendering output result, then the actual, "true" texture data values for that texture layer (at least in regions where it will not contribute to the overall rendering output result) are not needed, and so the fetching (looking up) of those texture data values by the texture mapper 14 from the memory 20 can be omitted, without there being any detrimental effect on the rendering operation itself. Furthermore, the need or otherwise to fetch (look up) the true texture data values for a texture layer when performing a rendering operation that combines plural texture layers can be identified from the corresponding contribution control data that is provided for the rendering operation (as illustrated, for example, in FIGS. 5 and 6 above).

Thus, for example, for terrain mapping scenarios where the texture layers are numbered L0 (top most, closest to view), and L1 (layer below, further from viewer), the following optimizations would be possible.

For shaders implementing terrain using alpha-blending:

$$\mathrm{mix}(L0, L1, \mathrm{Control}.r)$$

then the actual texture data values for layer 1 (L1) are not required (and so their loading can be skipped) if Control.r is 1.0 for all fragments in the group being considered (as in that case, L0 is opaque and completely obscures L1). Correspondingly, the actual texture data values for layer 0 (L0) are not required (and so their loading can be skipped) if Control.r is 0.0 for all fragments in the group being considered (as in that case, L0 is transparent and completely invisible).

Correspondingly, for shaders implementing terrain using additive blending:

$$\mathrm{diff} = L0 * \mathrm{Control}.r + L1 * \mathrm{Control}.g$$

then the actual texture data values are not required (and so their loading can be skipped) for a texture layer if its relevant control weight is 0.0.

For some content where the texture itself contains an alpha (transparency) channel which is used in the mix function, such as for decals, then the "mix" function may be more complex:

$$\mathrm{mix}(L0, L1, \mathrm{Control}.r * L0.a)$$

In this case, the actual texture data values for layer L0 will always be required, but it may be possible to skip the load of L1 if Control.r*L0.a is 1.0 (so some level of compile-time analysis may needed to determine dependencies on what feeds the mix weights).

Thus, in the present embodiments, when the fragment shade core 12 is to perform a graphics rendering operation that combines plural texture layers in accordance with contribution control data that controls the contribution that each texture layer makes to the rendering operation for a group of plural fragments, the renderer 3 operates to, before fetching the actual texture data values for each fragment of the group for the texture layers for the graphics rendering operation, determine the texture operation contribution control data for the texture layers for each fragment in the group of fragments being processed, and based on the determined contribution control data for the texture layers to be combined in the graphics rendering operation, either fetches the texture data values for a texture layer for each fragment in the group from the memory 20, or does not fetch texture data values for the texture layer for each fragment in the group from memory, and instead sets a default value for that texture layer for each fragment in the group to be used in the graphics rendering operation.

The fragment shader then uses the fetched data values or the default data values for the respective texture layers, as appropriate, when performing the rendering operation (and performs the rendering operation using those values).

In this way, the looking up of the actual texture data values is omitted for texture layers that it can be determined from the contribution control data will not actually contribute to the rendering output result for all the fragments in the group of fragments being considered.

In the present embodiments, this operation of the fragment shader core when it is to perform a graphics rendering operation that combines plural texture layers in accordance with contribution control data that cause contribution that each texture layer makes to the rendering operation for a group of plural fragments is triggered by the compiler for the fragment shader core 12 including an appropriate instruction to trigger that operation in a shader program to be executed by the fragment shader core. The compiler may, e.g. run as part of the driver 61 for the graphics processor 10. Other arrangements would, of course, be possible.

(A shader program to be executed by the fragment shader core 12 will be provided by the application that requires the graphics processing using a high-level shader programming language, such as GLSL, HLSL, OpenCL, etc. The high-level shader program is then translated by a shader language compiler to binary code for the target graphics processing pipeline.)

As part of the compilation process for converting the high-level shader language expressions to binary code instructions, the compiler may analyse the high-level shader program to identify whether it includes operations that will perform graphics rendering operations that combines plural texture layers in accordance with contribution control data that controls the contribution that each texture layer makes to the rendering operation, and, if so, analyse the use of the texture layers in rendering operations in the shader program in question to determine when operation in the manner of the present embodiments would be possible. If so, the compiler may then include in the compiled shader program that is provided to the fragment shader core 12 for execution, an appropriate instruction to trigger operation in the manner of the present embodiments.

Figure 8:
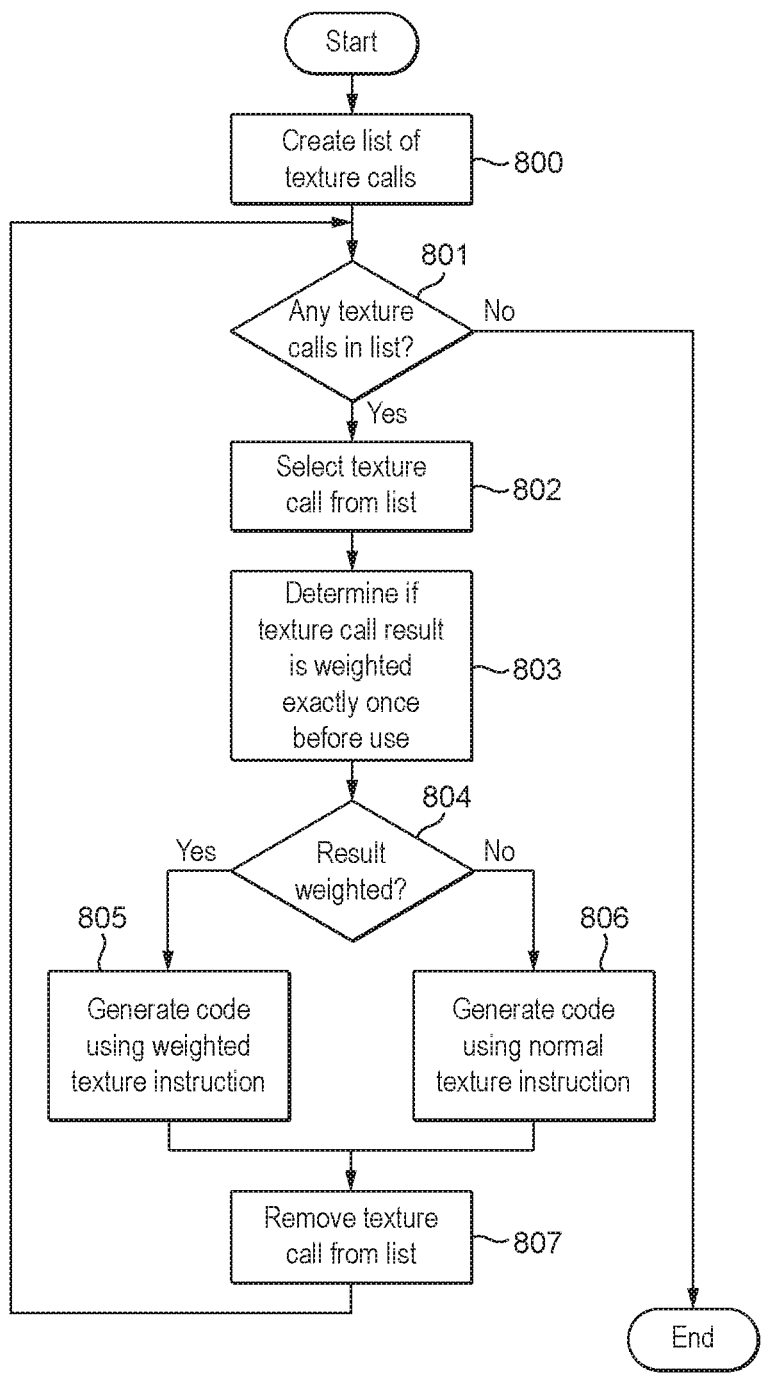
FIG. 8 shows part of the fragment shader program compiler operation in an embodiment of the technology described herein.

FIG. 8 shows schematically this compiler operation in the embodiments of the technology described herein. Other arrangements would, of course, be possible.

As shown in FIG. 8, the process starts by the compiler creating a list of all the texture calls in the fragment shader program being compiled (step 800). The compiler then iterates through all the texture calls (fetches/lookups) in the list (steps 801 and 807), and for each texture call in the list (step 802), determines if the result of that texture call is weighted with contribution control data exactly once before it is used (steps 803 and 804).

If the texture call result is weighted with contribution control data exactly once before use in the shader program, then the compiler operates to include a texture instruction that will trigger the above operation in the manner of the present embodiment when the fragment shader program is executed (step 805).

On the other hand, if the compiler determines that the result for the texture call being considered is not weighted using contribution control data exactly once before use, then the compiler does not modify the shader program to trigger operation in the manner of the technology described herein in respect of the texture call in question, but instead compiles the shader program using the "normal" texture instruction (in the normal manner) (step 806).

This operation is repeated until all the texture calls in the list have been considered (steps 801 and 807).

An exemplary shader program that performs alpha (transparency) blending that could be optimised in the manner of the present embodiments is shown below:

```
#version 100
precision mediump float;
// Alpha blend three terrain layers. In this shader we assume the base layer
// -- texColorB -- is guaranteed to be opaque, but may be occluded by higher
// layers in the texture stack if they are completely opaque
uniform sampler2D texControl;
uniform sampler2D texColorR;
uniform sampler2D texColorG;
uniform sampler2D texColorB;
varying vec2 texCoord;
void main( ) {
  // Load control weights for all layers from the control texture
  vec2 rawWeights = texture2D(texControl, texCoord).rg;
  // Compute SRC_ALPHA, 1 - SRC_ALPHA blended weights for
  all three layers
  float weightR = rawWeights.r;
  float weightG = rawWeights.g * (1.0 - rawWeights.r);
  float weightB = (1.0 - rawWeights.r) * (1.0 - rawWeights.g);
  // Issue texture operations
  gl_FragColor = texture2D(texColorR, texCoord) * weightR;
  gl_FragColor += texture2D(texColorG, texCoord) * weightG;
  gl_FragColor += texture2D(texColorB, texCoord) * weightB;
}
```

An exemplary shader program that performs additive blending that could be optimised in the manner of the present embodiments is shown below:

```
#version 100
precision mediump float;
// Additively blend three terrain layers.
// The offline tool flow must take responsibility for setting weights
// which don't unacceptably saturate the colors (e.g. all three layers
// set to 1), but the per-fragment shading cost is lower than the
// alpha-blended version.
uniform sampler2D texControl;
uniform sampler2D texColorR;
uniform sampler2D texColorG;
uniform sampler2D texColorB;
varying vec2 texCoord;
void main( ) {
  // Load control weights for all layers from the control texture
  vec3 rawWeights = texture2D(texControl, texCoord).rgb;
  // Issue texture operations
  gl_FragColor = texture2D(texColorR, texCoord) * rawWeights.r;
  gl_FragColor += texture2D(texColorG, texCoord) * rawWeights.g;
  gl_FragColor += texture2D(texColorB, texCoord) * rawWeights.b;
}
```

The above exemplary shader programs include the code:

gl_FragColor=texture2*D*(texColor*R*,tex Coord)\*weight*R*;

In an arrangement that is not in the manner of the technology described herein, this could be translated into two pseudo-instructions:

```
<tmp> = TEX2D <texColorR>, <texCoord>
<result> = MUL <TMP>, weightR
```

On the other hand, when implementing this code in the manner of the technology described herein and the present embodiments, this would also translate into two pseudo-instructions:

```
<tmp>= TEX2D_WEIGHT <texColorR>, <texCoord>, <weightR>
<result> = MUL <TMP>, weightR
``` but the texturing operation instruction <tmp> in this case takes an additional operand <weightR> which provides the per-thread texture contribution control data (factor).

Other arrangements would, of course, be possible.

Figure 9:
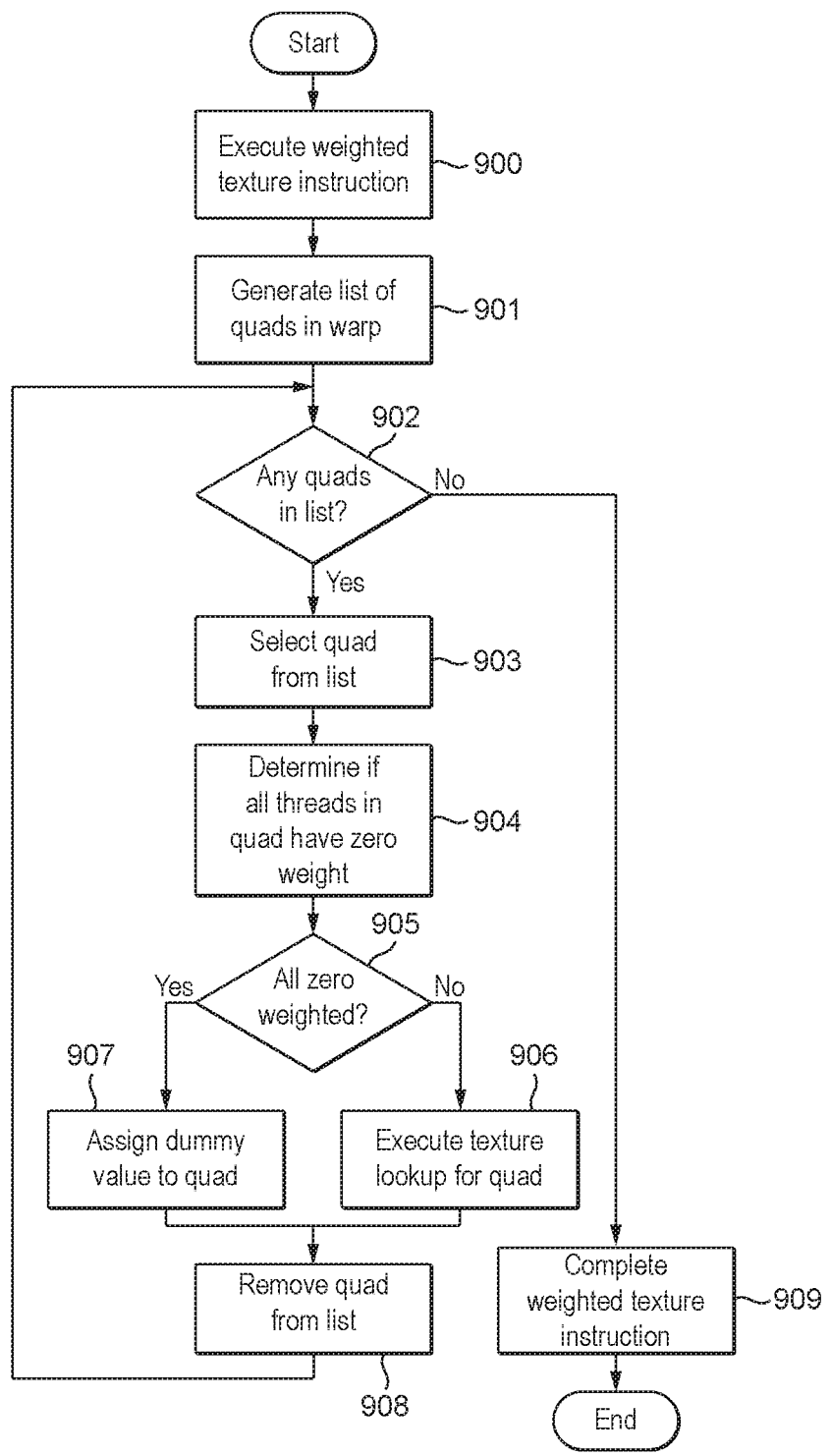
FIG. 9 shows a part of the fragment shader program execution in an embodiment of the technology described herein.

FIG. 9 correspondingly shows schematically the operation of the fragment shader core 12 of the renderer 3 when it encounters an instruction to operate in the manner of the present embodiments (i.e. to determine (ascertain) texture operation contribution control data for layers for a rendering operation, and to, based on the determined contribution control data, then determine whether to fetch the texture data values for a texture layer or to use default, dummy values for that texture layer for the graphics rendering operation).

As shown in FIG. 9, the process starts when the fragment shader core 12 encounters and executes a weighted texture instruction of the form of the present embodiments in a shader program (step 900).

In response to that instruction, a list of the fragment quads being processed in parallel (i.e. that the thread group (warp) that the fragment shader core is currently executing the instruction for) is generated (step 901). (In the present embodiment, it is assumed that the fragment shader core processes thread groups (warps) that contain plural fragment quads, but other arrangements, in which the thread group (warp) width is a single fragment quad, would be possible, if desired.)

The process then iterates through all the fragment quads in the list (step 902 and 908), and for each quad (step 903), it is determined from the determined contribution control data for the rendering operation if all the threads (i.e. fragments) in the quad have zero weight in the rendering operation for a texture layer or layers (i.e. whether a texture layer or layers will contribute to any of the fragments (threads) in the quad or not) (steps 904 and 905).

If a texture layer is determined to have zero weight for all threads (fragments) in the quad, then a dummy value is assigned for that texture layer to all the fragments in the quad (step 907), but if not all the fragments in the quad are determined to be zero weighted, then the texture look-up is performed for the quad in the normal manner (step 906), so as to fetch the actual texture data values for the fragments in the quad for the texture layer in question from memory.

This is repeated for all the quads in the thread group (warp) in question, and once all the quads in the warp have been considered, the weighted texture instruction is completed (step 909), to return the appropriate dummy or actual texture data values for the texture layers for the quads being processed to the fragment shader core 12 for use when subsequently executing the texture "mix" (combining) operation in the shader program.

This process is repeated for each group of quads (thread group (warp)) that the shader program in question is executed for.

In the arrangement shown in FIG. 9, the contribution control data (and whether a texture layer contributes to the rendering output) is considered for respective 2×2 fragment quads. It would also be possible, if desired, to perform that consideration for the thread groups (warps) as a whole, i.e. to only use dummy values for a texture layer for the fragment quads that a thread group (warp) corresponds to if it can be determined that for all the fragments for all the quads in the thread group (warp), the texture layer will not contribute to the rendering operation.

The determination of whether the actual texture data values for a texture layer need to be fetched, or whether default texture data values can be used instead for a texture layer in response to an instruction that triggers that determination in a shader program being executed by the fragment shader core 12 is performed in the present embodiments by the texture mapper (the texture mapping execution unit) 14 of the renderer 3.

The texture mapper 14 could itself determine (ascertain) the contribution control data for the texture layer or layers for the fragments in a fragment quad, and then determine whether to fetch (look-up) the actual texture data values or not, accordingly.

Alternatively, a "frontend" control unit (e.g. a message daemon) that sends messages to the texture mapper 14 to trigger its operations could determine (ascertain) the relevant contribution data values (weights) for the fragments for the texture layer or layers in question, but then pass an appropriate indication of those contribution control data values for the fragments to the texture mapper 14 for the texture mapper then to determine whether to perform the texture data value fetch (look-up) or not.

In this case, the frontend controller could provide the actual contribution control data values (e.g. as full floating point values) to the texture mapper 14 to do the determination, or, e.g., in the case where it is simply desired to determine whether the contribution of a texture layer is non-zero (useful) or zero (redundant), the contribution control data could be sent as a single bit per fragment (either 1 or 0, depending upon whether the contribution of the texture layer is useful or not), with the texture mapper then using that contribution indication to determine whether the texture look-up (fetch) is required or not.

It would also be possible for the frontend controller for the texture mapper, if present, to itself perform the determination of whether to fetch the actual texture data values for a texture layer or not, if desired. In this case, rather than that frontend controller passing contribution control data information to the texture mapper for the texture mapper to do the determination, the frontend controller will itself perform the determination and then either send control messages to the texture mapper to perform the texture data value look-ups (fetches) or not, accordingly.

In another embodiment, both the frontend controller (message daemon) and the texture mapper could perform a determination of whether to fetch the actual texture data values for a texture layer or not. In this case, the frontend controller could, for example, perform the determination for thread groups (warps) as a whole, with the texture mapper then (if necessary) performing the determination for individual fragment groups (e.g. quads) within a thread group (warp).

FIGS. 10 to 13 illustrate these possible arrangements.

Figure 10:
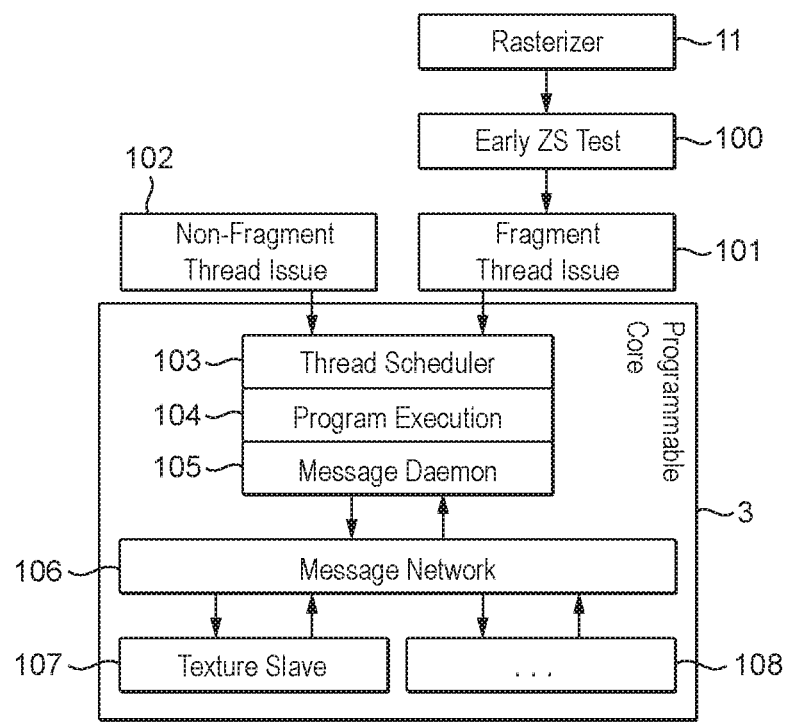
FIG. 10 shows in more detail an exemplary graphics processing system in which the technology described herein may be implemented.

FIG. 10 shows a basic graphics processor arrangement, which corresponds to the arrangement shown in FIG. 3. Thus, as shown in FIG. 10, the graphics processor includes a rasteriser 11 followed by an early depth and stencil (ZS) testing stage 100 (which may be implemented as part of the rasteriser), with fragments and sampling positions that pass the early ZS test then being issued as respective threads 101 to the programmable execution core 3, which, inter alia, performs the required fragment shading operations.

(FIG. 10 also shows for completeness the possibility 102 of issuing threads to the programmable core 3 for other purposes (i.e. that do not correspond to fragments generated by the rasteriser 11).)

As shown in FIG. 10, the programmable shader core 3 includes, inter alia, a thread scheduler 103, a program execution unit(s) 104, and a message daemon (frontend controller) 105 that is operable to send messages via a message network 106 to hardware accelerators (slaves) that are operable to perform processing operations for and in response to instructions in a shader program being executed for a thread.

For simplicity, FIG. 10 simply shows the texture mapper (texture slave) 107 as being an exemplary accelerator slave of the programmable execution core 3 that is controlled by the message daemon 105 via the message network 106, but as shown in FIG. 10, there could be other accelerators (slaves) 108 available to the programmable shader core 3, such as a varying interpolator, a blender, etc.

Figure 11:
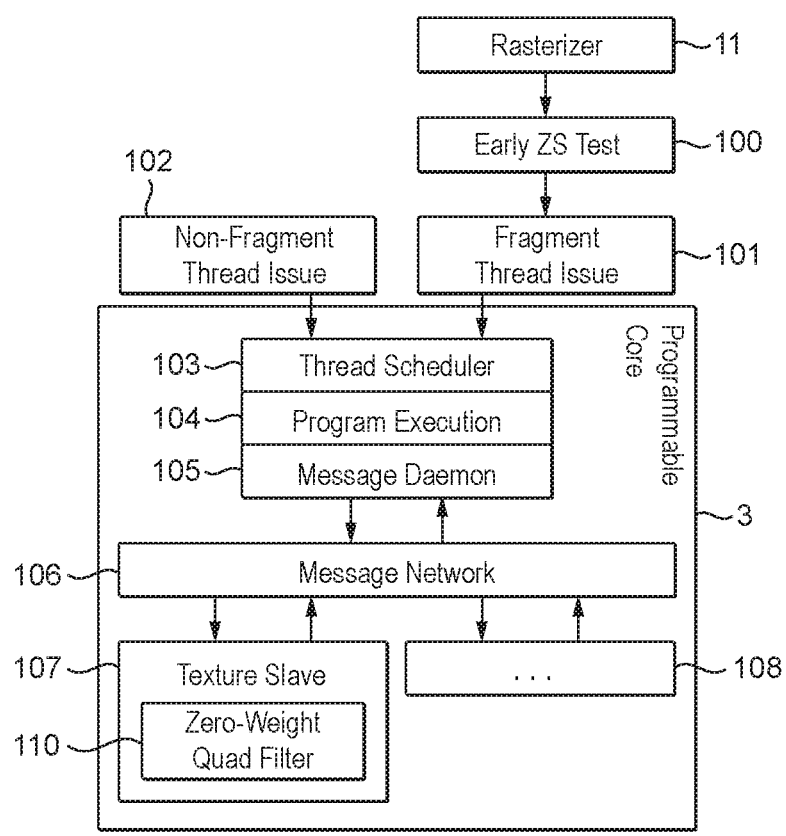
FIG. 11 shows a first embodiment of an implementation of the technology described herein in a graphics processing system of the form shown in FIG. 10.
Figure 12:
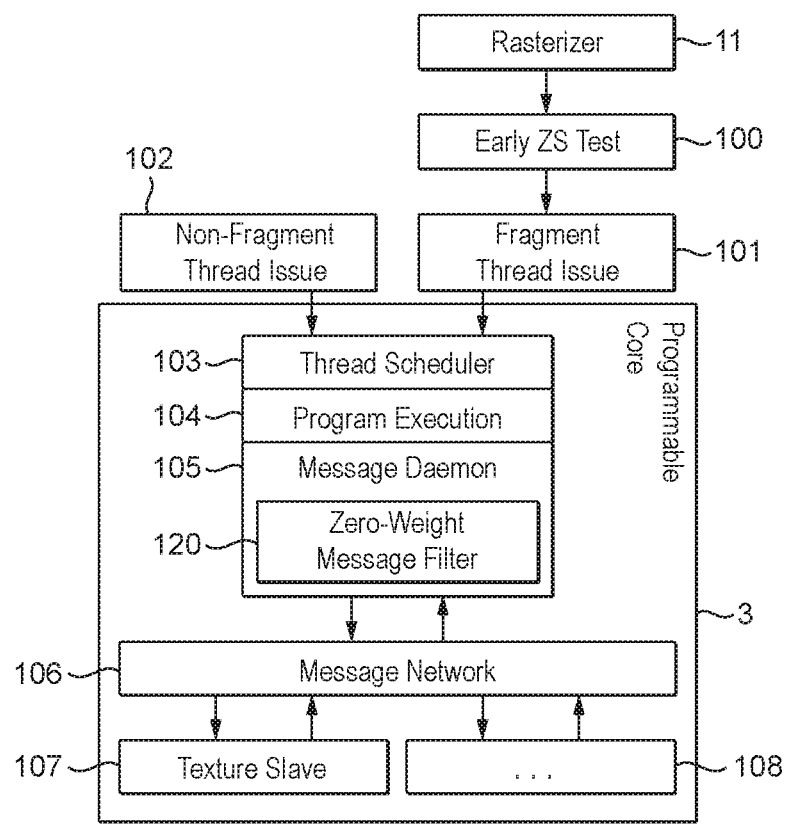
FIG. 12 shows a second embodiment of an implementation of the technology described herein in a graphics processing system of the form shown in FIG. 10.

FIG. 11 shows the graphics processor arrangement of FIG. 10, but in the case where the texture mapper (texture slave) 107 is operable to perform the determination of whether the actual data values for a texture layer are required for a group of fragments or not. Accordingly, as shown in FIG. 11, the texture mapper (texture slave) 107 includes a fragment quad "zero-weight" filter unit 110 that is operable to determine whether a texture layer will contribute to a rendering output for respective fragment quads that the texture mapper (slave) 107 has been requested to perform texture lookups for by the message daemon 105. In this case, the texture layer contribution determination is applied per fragment group (quad) within the texture mapper itself FIG. 12 shows an alternative embodiment to FIG. 11, in which the texture layer contribution determination is performed in the controlling frontend message daemon 105, rather than in the texture mapper (slave) 107. Thus in this case, the message daemon 105 includes a texture layer contribution determining filter unit 120. In this case, it is assumed that the texture layer contribution determination in the message daemon 105 is performed for thread groups (warps) as a whole. This will then have the effect that no redundant message traffic is generated on the message network 106 if it is determined that an entire thread group (warp) will have a zero contribution for a particular texture layer, but, unlike the arrangement in FIG. 11, this embodiment is unable to reduce the number of texture lookups for thread groups (warps) which contain multiple fragment groups (e.g. quads) of which only some actually require a texture lookup.

Figure 13:
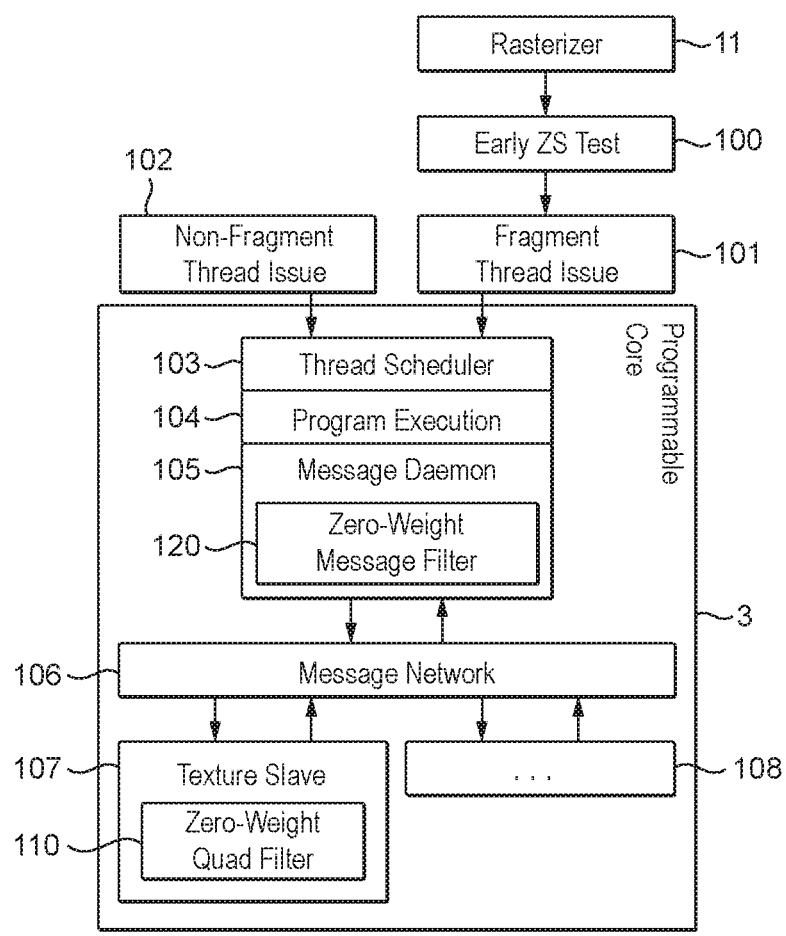
FIG. 13 shows a third embodiment of an implementation of the technology described herein in a graphics processing system of the form shown in FIG. 10.

FIG. 13 accordingly shows an embodiment in which the texture layer contribution determination is performed both in the frontend controller message daemon 105 on a thread group (warp) basis, and in the texture mapper (slave) 107 on a fragment group (quad) basis. In this case therefore, entire thread groups (warps) for which no texture lookup is required can be filtered and identified in the message daemon 105, but for thread groups (warps) for which only some of the fragment groups (quads) require texture lookups, any fragment groups (quads) that do not require texture lookups can still be identified in the texture mapper (slave) 107.

Figure 14:
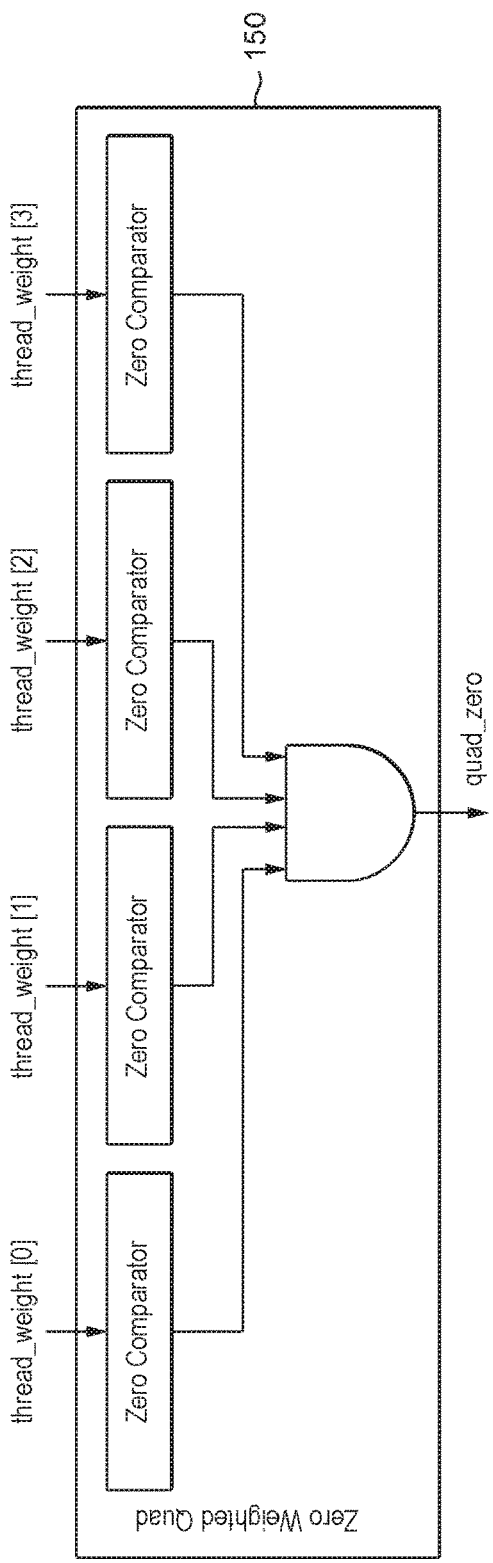
FIGS. 14 and 15 show exemplary embodiments of the texture weight determining filters shown in FIGS. 11 to 13.
Figure 15:
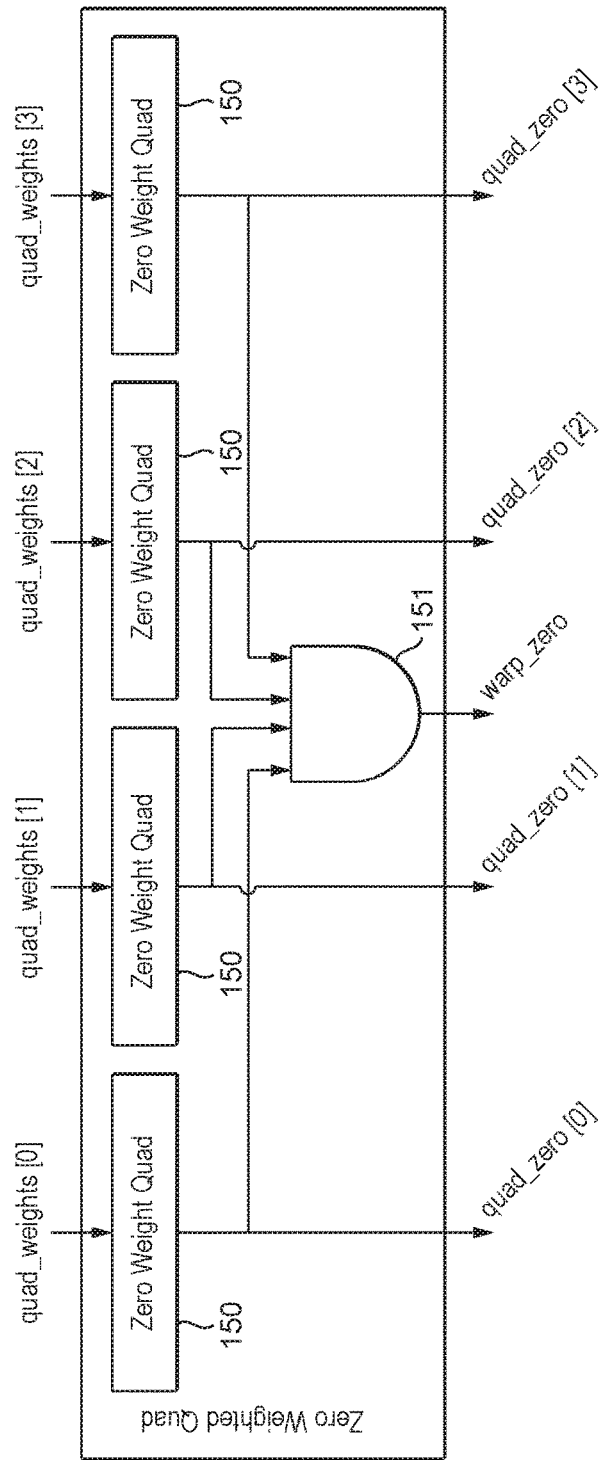

FIGS. 14 and 15 show exemplary arrangements for the texture layer contribution determining filter units 110, 120 shown in FIGS. 11-13.

FIG. 14 shows an exemplary arrangement for the fragment quad "zero weight" filter unit 110 that is included in the texture mapper (texture slave) 107. As shown in FIG. 14, this filter 150 takes as its input the (e.g. floating point) weight values for threads corresponding to the fragments of the quad, and returns, e.g., "1" if all threads (fragments) are zero weight (and so can be skipped), or "0" otherwise.

FIG. 15 shows the corresponding arrangement for the zero-weight filter 120 in the message daemon 105, that acts as an aggregate per-thread group (warp) filter. FIG. 15 shows an exemplary sixteen thread thread group (warp) consisting of four quads.

This arrangement has, as shown in FIG. 15, four "zero weight" quad filters 150 of the form shown in FIG. 14 that determine for each individual quad whether all the threads in the quad are zero weight, but then also considers 151 the combination of all the quads together to see if all the quads within the thread group have zero weight.

Thus the inputs to the zero weight quad filters 150 are again the per-thread weights (for the fragment quad in question), and those zero weight quad filters 150 will correspondingly give an output of "1" if all the threads in a quad are zero weight. The thread group (warp)-wide comparator 151 will correspondingly give an output of "1" if all the quads in the thread group (warp) are zero weight.

This arrangement for the zero weight message filter 120 in the message daemon will also mean that where this filtering is also being performed in the texture mapper (slave) 107, then only the "is 0" state bit for each quad would need to be sent to the texture slave 107 for that purpose (rather than, e.g., having to send the full floating point values to the texture slave 107) (and if the entire thread group is zero weight, then, as discussed above, in an embodiment nothing will be sent to the texture mapper (texture slave) 107).

Other arrangements for the "zero-weight" filtering would, of course, be possible.

It can be seen from the above that the technology described herein, in its embodiments at least, can provide a more efficient rendering operation, e.g. where plural texture layers are to be combined based on contribution control data, by facilitating skipping fetching actual texture data values for texture layers that it can be determined will not actually contribute to the overall rendering result.

This is achieved, in the embodiments of the technology described herein at least, by, before fetching actual texture data values for a texture layer or layers, first determining whether a texture layer or layers will actually contribute to the rendering result based on the contribution control data for the rendering operation for respective groups of fragments for which the rendering operation is to be performed.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor that executes a graphics processing pipeline to perform graphics processing operations, and which graphics processor comprises:

a rasteriser that rasterises input primitives to generate graphics fragments to be processed, each graphics fragment having one or more sampling points associated with it;

and a renderer that performs graphics rendering operations on graphics fragments generated by the rasteriser;

the method comprising:

when the renderer is to perform, for a group of plural fragments that it is rendering as a group of fragments together, a graphics rendering operation that uses one or more texture layers in accordance with contribution control data that controls the contribution that each texture layer makes to the rendering operation:

the renderer:

before fetching the texture data values for each fragment of the group for at least one of the texture layers for the graphics rendering operation, determining texture contribution control data for each fragment in the group of fragments to be processed as a group of fragments together; and based on the determined contribution control data, either:

fetching the texture data values for the at least one texture layer for each fragment in the group from memory, and using the fetched texture data values for the at least one texture layer for each fragment in the group for the graphics rendering operation;

or using a dummy value for the at least one texture layer for each fragment in the group for the graphics rendering operation instead of fetching texture data values for the at least one texture layer for each fragment in the group from memory.

2. The method of claim 1, wherein the contribution control data for the rendering operation comprises at least one of: transparency values to be used for the texture layers; and contribution weight values to be used for the texture layers.

3. The method of claim 1, wherein:

the renderer includes a programmable fragment shader that is operable to execute execution threads as groups of plural execution threads, with each execution thread in a group corresponding to a fragment, and the threads of a thread group being executed in lockstep; and the group of fragments that is being rendered as a group of fragments together comprises the fragments that a group of threads that is being executed by the fragment shader as a group of plural execution threads together corresponds to.

4. The method of claim 1 comprising:

the renderer determining from the determined contribution control information, whether a texture layer will contribute to the output of the rendering operation for any of the plural fragments in the group; and when it is determined from the contribution control information that a texture layer will not contribute to the output of the rendering operation for any of the fragments in the group, not fetching texture data values for that texture layer for each fragment in the group from memory and instead using a dummy value for that texture layer for each fragment in the group for the graphics rendering operation;

when it is determined from the contribution control information that a texture layer will contribute to the rendering output for at least one of the fragments in the group, fetching the texture data values for that texture layer for each fragment in the group from memory, and using the fetched texture data values for that texture layer for each fragment in the group for the graphics rendering operation.

5. The method of claim 1, comprising the renderer:

performing, for a group of plural fragments together, a graphics rendering operation that combines plural texture layers in accordance with contribution control data that controls the contribution that each texture layer makes to the rendering operation, the performing the graphics rendering operation comprising:

the renderer:

before fetching texture data values for each fragment of the group for at least one texture layer of the graphics rendering operation, determining texture contribution control data for each fragment in the group of fragments being processed; and based on the determined contribution control data, determining whether there is a texture layer for the graphics rendering operation that will not contribute to the output of the graphics rendering operation for any of the fragments in the group of fragments being processed; and when it is determined that there is a texture layer that will not contribute to the output of the graphics rendering operation for any of the fragments in the group of fragments being processed, using a dummy value for that texture layer for each fragment in the group of fragments being processed instead of fetching texture data values for that texture layer from memory; and for any texture layer for which it is not determined that the texture layer will not contribute to the output of the graphics rendering operation for any of the fragments in the group of fragments being processed, fetching texture data values for that texture layer for each fragment in the group from memory;

and performing the graphics rendering operation using the fetched texture data values and any dummy values for the texture layers.

6. The method of claim 1, wherein:

the renderer includes a programmable fragment shader that executes fragment shader programs to perform fragment shading operations on graphics fragments generated by the rasteriser;

and the method further comprises:

including in a fragment shader program that includes an instruction or instructions that when executed will cause the renderer to perform a graphics rendering operation that uses one or more texture layers in accordance with contribution control data that controls the contribution that each texture layer makes to the rendering operation:

a graphics program instruction that when executed will cause the renderer to, before performing the graphics rendering operation that combines plural texture layers in accordance with contribution control data for a group of plural fragments that the renderer is rendering as a group of fragments together:

determine texture contribution control data for each fragment in the group of fragments to be processed as a group of fragments together before fetching any texture data values for each fragment of the group for at least one of the texture layers for the graphics rendering operation; and based on the determined contribution control data, either:

fetch texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

7. The method of claim 1, wherein:

the renderer includes a texture mapper operable to fetch texture data required for a graphics rendering operation to be performed by the renderer;

and the method comprises:

the texture mapper determining, based on the determined contribution control data, whether to:

fetch the texture data values for the at least one texture layer for each fragment in the group from memory, and provide the fetched texture data values for the at least one texture layer for each fragment in the group for the graphics rendering operation;

or provide a dummy value for the at least one texture layer for each fragment in the group for the graphics rendering operation instead of fetching texture data values for the at least one texture layer for each fragment in the group from memory.

8. The method of claim 7, wherein:

the renderer includes a controller operable to send messages to the texture mapper to trigger its operations;

and the method comprises:

the controller determining the contribution control data for the fragments in the group of fragments, and providing an indication of the determined contribution control data for the fragments to the texture mapper.

9. The method of claim 1, wherein:

the renderer includes a texture mapper operable to fetch texture data required for a graphics rendering operation to be performed by the renderer; and a controller operable to send messages to the texture mapper to trigger its operations;

and the method comprises:

the controller:

determining the contribution control data for the fragments in the group of fragments; and determining, based on the determined contribution control data, whether to:

send a message to the texture mapper to trigger the texture mapper to fetch the texture data values for the at least one texture layer for each fragment in the group from memory and provide the fetched texture data values for the at least one texture layer for each fragment in the group for the graphics rendering operation;

or provide a dummy value for the at least one texture layer for each fragment in the group for the graphics rendering operation instead of sending a message to the texture mapper to trigger the texture mapper to fetch texture data values for the at least one texture layer for each fragment in the group from memory.

10. A graphics processor comprising:
a rasteriser circuit configured to rasterise input primitives to generate graphics fragments to be processed, each graphics fragment having one or more sampling points associated with it;
and
a renderer circuit configured to perform graphics rendering operations on graphics fragments generated by the rasteriser circuit;
wherein the renderer circuit is configured to:
when the renderer circuit is to perform, for a group of plural fragments that it is rendering as a group of fragments together, a graphics rendering operation that uses one or more texture layers in accordance with contribution control data that controls the contribution that each texture layer makes to the rendering operation:
before fetching the texture data values for each fragment of the group for at least one of the texture layers for the graphics rendering operation, determine texture contribution control data for each fragment in the group of fragments to be processed as a group of fragments together; and
based on the determined contribution control data, either:
fetch the texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory.

11. The graphics processor of claim 10, wherein the contribution control data for the rendering operation comprises at least one of: transparency values to be used for the texture layers; and contribution weight values to be used for the texture layers.

12. The graphics processor of claim 10, wherein:
the renderer circuit includes a programmable fragment shader circuit that is operable to execute execution threads as groups of plural execution threads, with each execution thread in a group corresponding to a fragment, and the threads of a thread group being executed in lockstep; and
the group of fragments that is being rendered as a group of fragments together comprises the fragments that a group of threads that is being executed by the fragment shader as a group of plural execution threads together corresponds to.

13. The graphics processor of claim 10, wherein the renderer circuit is configured to:
determine from the determined contribution control information, whether a texture layer will contribute to the output of the rendering operation for any of the plural fragments in the group; and
when it is determined from the contribution control information that a texture layer will not contribute to the output of the rendering operation for any of the fragments in the group, use a dummy value for that texture layer for each fragment in the group for the graphics rendering operation instead of fetching texture data values for that texture layer for each fragment in the group from memory;
when it is determined from the contribution control information that a texture layer will contribute to the rendering output for at least one of the fragments in the group, fetch the texture data values for that texture layer for each fragment in the group from memory, and use the fetched texture data values for that texture layer for each fragment in the group for the graphics rendering operation.

14. The graphics processor of claim 10, wherein the renderer circuit is configured to:
perform, for a group of plural fragments together, a graphics rendering operation that combines plural texture layers in accordance with contribution control data that controls the contribution that each texture layer makes to the rendering operation, the performing the graphics rendering operation comprising:
the renderer circuit:
before fetching texture data values for each fragment of the group for at least one texture layer of the graphics rendering operation, determining texture contribution control data for each fragment in the group of fragments being processed; and
based on the determined contribution control data, determining whether there is a texture layer for the graphics rendering operation that will not contribute to the output of the graphics rendering operation for any of the fragments in the group of fragments being processed; and
when it is determined that there is a texture layer that will not contribute to the output of the graphics rendering operation for any of the fragments in the group of fragments being processed, using a dummy value for that texture layer for each fragment in the group of fragments being processed instead of fetching texture data values for that texture layer from memory; and
for any texture layer for which it is not determined that the texture layer will not contribute to the output of the graphics rendering operation for any of the fragments in the group of fragments being processed, fetching texture data values for that texture layer for each fragment in the group from memory;
and
performing the graphics rendering operation using the fetched texture data values and any dummy values for the texture layers.

15. The graphics processor of claim 10, wherein:
the renderer circuit includes a programmable fragment shader circuit that executes fragment shader programs to perform fragment shading operations on graphics fragments generated by the rasteriser circuit;
and
the renderer circuit is configured to:
determine texture contribution control data for each fragment in a group of fragments to be processed as a group of fragments together before fetching any texture data values for each fragment of the group for at least one of the texture layers for the graphics rendering operation; and
based on the determined contribution control data, either:
fetch texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory,
in response to an instruction in a fragment shader program being executed by the programmable fragment shader circuit.

16. The graphics processor of claim 10, wherein:
the renderer circuit includes a texture mapper circuit operable to fetch texture data required for a graphics rendering operation to be performed by the renderer circuit;
and the texture mapper circuit is configured to:
determine, based on the determined contribution control data, whether to:
fetch the texture data values for the at least one texture layer for each fragment in the group from memory, and provide the fetched texture data values for the at least one texture layer for each fragment in the group for the graphics rendering operation;
or provide a dummy value for the at least one texture layer for each fragment in the group for the graphics rendering operation instead of fetching texture data values for the at least one texture layer for each fragment in the group from memory.

17. The graphics processor of claim 16, wherein:
the renderer circuit includes a controller circuit configured to send messages to the texture mapper circuit to trigger its operations;
and the controller circuit is configured to:
determine the contribution control data for the fragments in a group of fragments, and provide an indication of the determined contribution control data for the fragments to the texture mapper circuit.

18. The graphics processor of claim 10, wherein:
the renderer circuit includes a texture mapper circuit configured to fetch texture data required for a graphics rendering operation to be performed by the renderer circuit; and
a controller circuit configured to send messages to the texture mapper circuit to trigger its operations;
and
the controller circuit is configured to:
determine the contribution control data for the fragments in a group of fragments; and
determine, based on the determined contribution control data, whether to:
send a message to the texture mapper to trigger the texture mapper to fetch the texture data values for the at least one texture layer for each fragment in the group from memory and provide the fetched texture data values for the at least one texture layer for each fragment in the group for the graphics rendering operation;
or provide a dummy value for the at least one texture layer for each fragment in the group for the graphics rendering operation instead of sending a message to the texture mapper to trigger the texture mapper to fetch texture data values for the at least one texture layer for each fragment in the group from memory.

19. A graphics processing system comprising:
a graphics processor comprising:
a rasteriser circuit configured to rasterise input primitives to generate graphics fragments to be processed, each graphics fragment having one or more sampling points associated with it;
and
a renderer circuit configured to perform graphics rendering operations on graphics fragments generated by the rasteriser circuit, the renderer circuit including a programmable fragment shader circuit configured to execute fragment shader programs to perform fragment shading operations on graphics fragments generated by the rasteriser circuit;
the graphics processing system further comprising:
a processing circuit configured to include in a fragment shader program that includes an instruction or instructions that when executed will cause the renderer circuit to perform a graphics rendering operation that uses one or more texture layers in accordance with contribution control data that controls the contribution that each texture layer makes to the rendering operation:
a graphics program instruction that when executed will cause the renderer circuit to, before performing the graphics rendering operation that uses one or more texture layers in accordance with contribution control data for a group of plural fragments that the renderer circuit is rendering as a group of fragments together:
determine texture contribution control data for each fragment in the group of fragments to be processed as a group of fragments together before fetching any texture data values for each fragment of the group for at least one of the texture layers for the graphics rendering operation; and
based on the determined contribution control data, either:
fetch texture data values for the at least one texture layer for each fragment in the group from memory, and use the fetched texture data values for the at least one texture layer for each fragment in the group for the graphics rendering operation;
or use a dummy value for the at least one texture layer for each fragment in the group for the graphics rendering operation instead of fetching texture data values for the at least one texture layer for each fragment in the group from memory;
and wherein:
the programmable fragment shader circuit of the renderer circuit is configured to, when executing a fragment shader program that includes the graphics program instruction for a group of plural fragments that the renderer circuit is rendering as a group of fragments together, in response to the graphics program instruction, cause the renderer circuit to:
for the group of plural fragments that is being rendered as a group of fragments together:
determine texture contribution control data for each fragment in the group of fragments being rendered as a group of fragments together, before fetching the texture data values for each fragment of the group for at least one of the texture layers for the graphics rendering operation; and
based on the determined contribution control data, either:
fetch the texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

20. A non-transitory computer readable storage medium storing computer software code that when executed on a processor performs a method of compiling programs to generate instructions for execution by a programmable fragment shading circuit of a renderer circuit of a graphics processor, the method comprising:

including in a fragment shader program to be executed by a programmable fragment shading circuit of a renderer circuit of a graphics processor that includes an instruction or instructions that when executed will cause the renderer circuit to perform a graphics rendering operation that uses one or more texture layers in accordance with contribution control data that controls the contribution that each texture layer makes to the rendering operation:

a graphics program instruction that when executed will cause the renderer circuit to, before performing the graphics rendering operation that uses one or more texture layers in accordance with contribution control data for a group of plural fragments that the renderer is rendering as a group of fragments together:

determine texture contribution control data for each fragment in the group of fragments to be processed as a group of fragments together before fetching any texture data values for each fragment of the group for at least one of the texture layers for the graphics rendering operation; and based on the determined contribution control data, either:

fetch texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

21. The non-transitory computer readable storage medium of claim 20 storing computer software code that when executed on a processor performs the method further comprising:

analyzing a fragment shader program to determine if it includes instructions to perform a rendering operation that is to use one or more texture layers in accordance with contribution control data;

and when it is determined that a fragment shader program includes instructions to perform such an operation, then determining whether that is the only rendering operation in the shader program in which some or all of the texture layers that the rendering operation relates to are used;

and when it is determined that the rendering operation is the only rendering operation in the shader program in which some or all of the texture layers that the rendering operation relates to are used, then including in the fragment shader program:

a graphics program instruction that when executed will cause the renderer circuit to, before performing the graphics rendering operation that uses one or more texture layers in accordance with contribution control data for a group of plural fragments that the renderer is rendering as a group of fragments together:

determine texture contribution control data for each fragment in the group of fragments to be processed as a group of fragments together before fetching any texture data values for each fragment of the group for at least one of the texture layers for the graphics rendering operation; and based on the determined contribution control data, either:

fetch texture data values for the at least one texture layer for each fragment in the group from memory, and use the fetched texture data values for the at least one texture layer for each fragment in the group for the graphics rendering operation;

or use a dummy value for the at least one texture layer for each fragment in the group for the graphics rendering operation instead of fetching texture data values for the at least one texture layer for each fragment in the group from memory.

* * * * *